(12) United States Patent
Jenkins

(10) Patent No.: US 8,548,422 B2
(45) Date of Patent: *Oct. 1, 2013

(54) VERSATILE PERSONAL MEDICAL EMERGENCY COMMUNICATION SYSTEM

(76) Inventor: Nevin C. Jenkins, Homosassa, FL (US)

( * ) Notice: Subject to any disclaimer, the term of this patent is extended or adjusted under 35 U.S.C. 154(b) by 703 days.

This patent is subject to a terminal disclaimer.

(21) Appl. No.: 12/398,860

(22) Filed: Mar. 5, 2009

(65) Prior Publication Data

US 2009/0227223 A1 Sep. 10, 2009

Related U.S. Application Data

(60) Provisional application No. 61/034,042, filed on Mar. 5, 2008.

(51) Int. Cl.
*H04M 11/04* (2006.01)

(52) U.S. Cl.
USPC .................. 455/404.1; 455/404.2; 379/38

(58) Field of Classification Search
USPC ....... 455/404.1–404.2, 425, 445; 379/37–40, 379/45, 48
See application file for complete search history.

(56) References Cited

U.S. PATENT DOCUMENTS

| | | | |
|---|---|---|---|
| 5,467,074 A * | 11/1995 | Pedtke | 340/539.11 |
| 5,673,304 A * | 9/1997 | Connor et al. | 379/45 |
| 6,049,273 A * | 4/2000 | Hess | 340/539.11 |
| 7,664,233 B1 * | 2/2010 | Kirchmeier et al. | 379/37 |
| 2003/0069002 A1 * | 4/2003 | Hunter et al. | 455/404 |
| 2003/0193404 A1 * | 10/2003 | Joao | 340/825.71 |
| 2003/0231115 A1 * | 12/2003 | Stanners et al. | 340/574 |
| 2005/0176434 A1 * | 8/2005 | White | 455/445 |
| 2005/0208925 A1 * | 9/2005 | Panasik et al. | 455/404.1 |
| 2006/0276166 A1 * | 12/2006 | Jenkins | 455/404.1 |
| 2008/0129518 A1 * | 6/2008 | Carlton-Foss | 340/573.1 |
| 2008/0133277 A1 * | 6/2008 | Jang et al. | 705/3 |
| 2009/0054027 A1 * | 2/2009 | Jenkins | 455/404.1 |

* cited by examiner

*Primary Examiner* — Jinsong Hu
*Assistant Examiner* — Nathan Taylor
(74) *Attorney, Agent, or Firm* — Fleit Gibbons Gutman Bongini & Bianco PL; Martin Fleit; Paul D. Bianco

(57) ABSTRACT

A versatile personal emergency, especially medical emergency, communication system includes a user-carried portable communication unit having a single button, which when depressed by the user, wirelessly sends a call request signal to a base unit. The base unit initiates a telephone call through a dial-up network to an emergency response center and places an operator at the emergency center in wireless voice communication with the portable unit when the call is connected. The telephone number of the emergency responder to be called is stored in the system. A program is used to set up the system to a selected one of a central monitoring station and a 911 operator. Voice messages are stored in the system and are used to advise the user of the status of the call, and to provide the user with verbal confirmation that functional systems of the base unit are operating properly. The units are programmable selectively by phone, voice or computer.

21 Claims, 21 Drawing Sheets

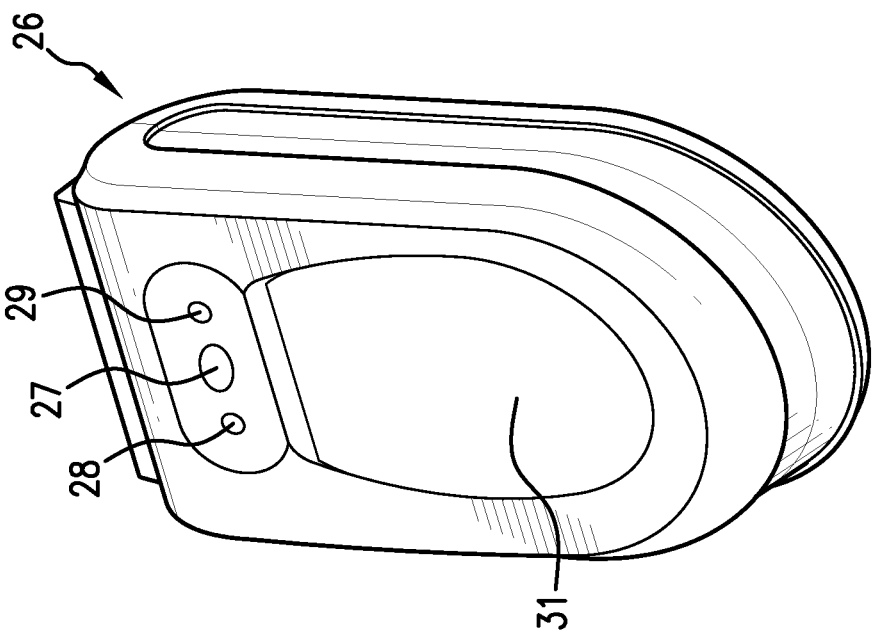
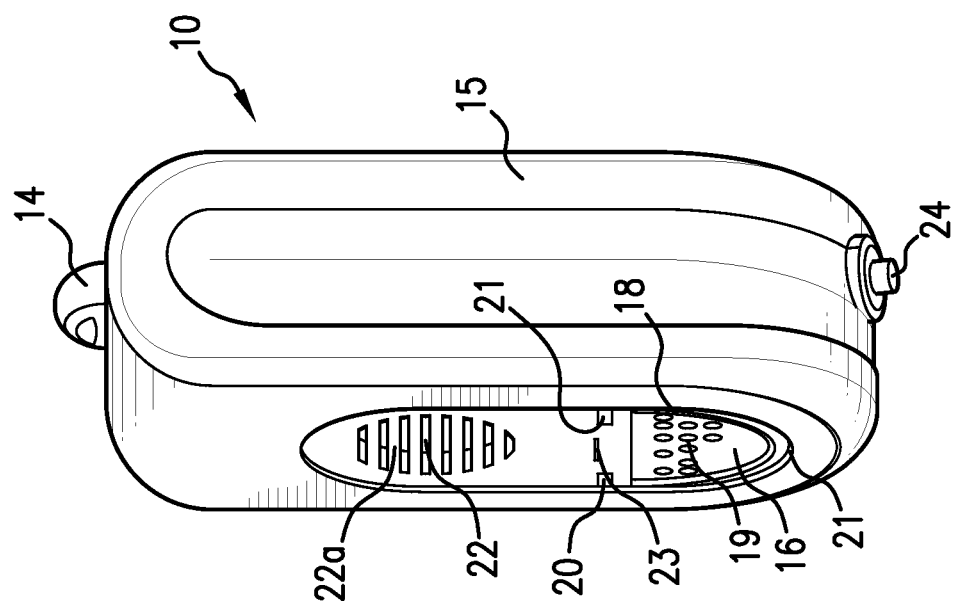

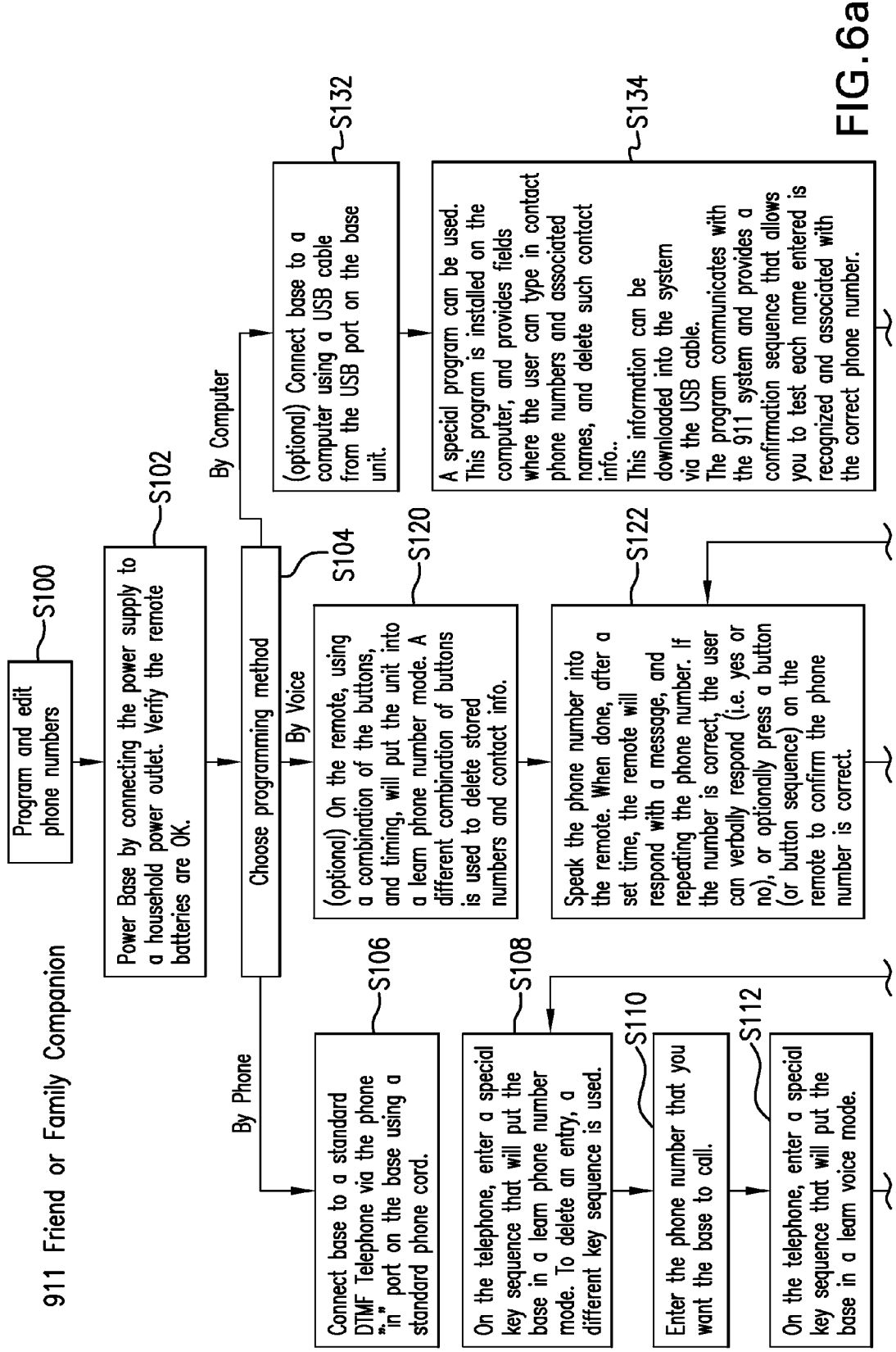

General note about buttons:
Pressing a button on either the base or remote as referenced herein can be considered as various methods of using a single button to perform multiple functions. Example, you may press and hold a button for a specific time for one function, and press and release the button can perform another function.

FIG.8

TEST MODES

Range and system test

By pressing a button on the remote an automatic system test will be perfomed and include the following:
Battery condition
Range test (the distance the remote can be from the base and function reliably)
Phone line check (verifies the phone line is connected and dial tone present)

The results from the systems check are reported to the user with factory programmed voice messages.

—S200

Battery test

By pressing a button on the remote a battery test will be performed. The results from the battery check are reported to the user with factory programmed voice messages.

—S202

Voice recognition test

By pressing a button on the remote a voice recognition test will be performed. This test consists of giving the remote voice commands such as the contact names you have programmed in.
The results from the test is that the remote will say the phone number that you programmed in for that name You can confirm, or delete and reprogram the contact information if it was not recorded correctly by using the above described method methods under the Programming section.

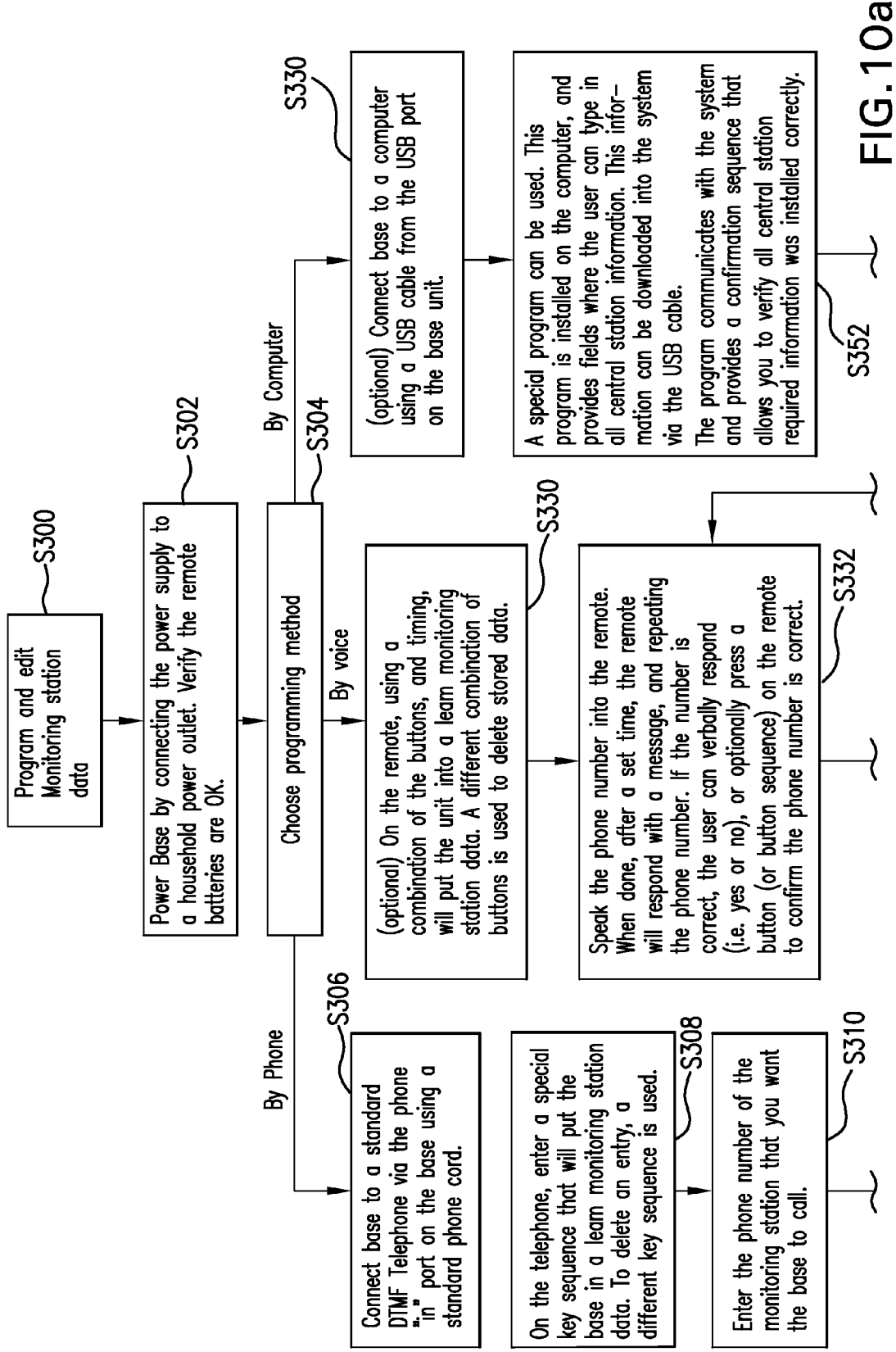

VERSATILE PERSONAL MEDICAL EMERGENCY COMMUNICATION SYSTEM

BACKGROUND OF THE INVENTION

1. Field of the Invention

The present invention broadly relates to personal medical emergency communication systems, and deals more particularly with a system for placing a user requiring emergency attention, especially a medical emergency, in direct voice communication with a preselected emergency responder, either a central monitoring station or a 911 operator with preprogramming to first call a relative, friend or other designated third party responder.

2. Prior Art

Various types of personal emergency communication devices had been developed which allow a person in need of immediate medical attention or other emergency service to contact someone in an emergency, such as an emergency service provider. In some cases, the user is required to subscribe to a proprietary communication system in which the service provider collects a monthly fee. These private systems typically rely on radio frequency communication between a portable communication unit worn or attached to the user, and a base station monitored by the service provider.

Numerous other forms of communication links have been employed to connect a remote subscriber with a monitoring station for emergency communications. Such links include telephone lines, cable television transmission lines, or dedicated land lines. Many recently developed systems utilize public telephone lines or VOIP because they are widely available and require minimal installation expense.

User-carried portable communication units are available in a variety of forms, including those that are automatically activated by an emergency event and those that are manually activated by a user in the event of an emergency. In the case of portable units capable of establishing a communication link with a specific emergency response center, such as a 911 center, most prior systems, while capable of dialing a 911 number, are restricted in their ability to place the user in direct, two way voice communication with the 911 operator. Moreover, existing personal communication systems capable of remotely dialing a 911 operator require the user to use keypads or manipulate a number of buttons or switches on a portable communications unit in order to place the call. A problem exists with these prior systems, in that the user may be substantially incapacitated by the medical condition which gives rise to the emergency call, thereby diminishing the user's ability to complete the steps that are necessary to place the call. This problem is particularly prevalent with elderly users having limited manual dexterity or diminished vision. Although other systems have been developed to try and solve these problems, there is still a need for a more sophisticated system that will more securely perform the necessary functions with the desired security.

Accordingly, there is a need in the art for a more versatile personal communication system which overcomes each of the disadvantages of the prior art discussed above, and which is both simple to use and inexpensive to construct. The present invention is directed toward satisfying this need.

SUMMARY OF THE INVENTION

According to one aspect of the invention, a versatile personal emergency response communication system is provided, comprising a portable communications unit intended to be carried by a user who may require emergency attention, and a base communication unit coupled with a dial up telephone system for establishing direct, two way voice communication between the user and a preselected emergency response center, either a central monitoring station or a 911 center operator. The base unit has an audible alarm, preferably a piezo type buzzer. It may also have a speaker and a microphone and could also be connected to a computer, such as a personal computer. The computer is primarily for programming. The portable unit includes a wireless transmitter and a receiver for communicating with the base unit, and a single call button actuated by the user to initiate a call request signal that results in placing the user in voice communication with the emergency response center or friend or family member. The portal unit also has a speaker and a microphone. The call button is recessed within a central opening in the portable unit and is surrounded with an upstanding ridge to aid the user in tactile location of the call button and will Braille projections.

The base unit includes a wireless transmitter and receiver for communicating with the portable unit, a memory for storing a telephone number of the emergency response center, a dialer for dialing the emergency response center telephone number, and a controller responsive to the call request signal for controlling the dialer to dial the preselected emergency response center telephone number. The base unit has an audible alarm and optionally can have a speaker and a microphone and can be also connected to a computer, such as a personal computer for programming. The portable unit includes an acoustic transducer providing the portable unit with a speaker-microphone phone function, thereby allowing voice communication between the user and the emergency response center. The system includes one or more preselected voice messages stored in a memory, and one or more speech synthesizers, which can be located in the portable unit or the base unit or both, which provides the user with automatic voice messages reporting the status of the call, as well as, the operational status of the base unit and portable, and serves to interact with the receiver of a call in an appropriate manner. The portable unit includes a test feature that may be initiated by the user to carry out functional testing of operating systems in the base unit and a monitor of the condition of the portable unit to insure it is operational when needed. In an alternative embodiment, the telephone number is stored in the portable communications unit and communicated to base unit when the single call button is actuated, such as, by depressing. However, the user may use the voice features of the portable unit and speak a name to call. If the spoken name is not understood, the default will be to call 911 or the central monitoring station however the system is programmed. Thereafter, the call is made by the base unit as described above. Likewise, one or more of the voice messages can be stored in the portable communications unit and activate when appropriate according to the activity between the base unit and the emergency response center.

According to another aspect of the invention, a personal emergency response communication system is provided comprising a portable, wireless communication unit intended to be carried by a user who may require emergency attention, and a base communication unit for wirelessly communicating with the portable unit. The portable unit includes a single, centrally located call button activatable by the user to transmit a call request signal to the base unit. The telephone number for the call request signal is stored in the system and initiated with the call request signal.

The base unit is coupled with a public dial up telephone system and is responsive to the call request signal for establishing voice communications between the user and an emergency response center. The system includes at least one stored voice message indicating the status of the communications with the response center or friend or family member, and a controller for controlling the activation of the voice message in the portable unit in order to advise the user of the communications status. The system also includes a speech synthesizer or voice chip for generating the stored voice message. In a preferred embodiment, the system includes at least two stored voice messages, respectively, indicating that the base unit has commenced dialing a call to the response center, and that the base unit is subsequently terminating the call when voice communications have been completed. The system may include at least a third stored voice message to advise the user of the operational status of various functional systems contained in the base unit and portable unit. Alternatively, the stored messages may be stored in the portable, wireless communication unit intended to be carried by a user or in the base unit.

According to still another aspect of the invention, a method is provided for calling an emergency response center from a user carried, portable communications unit, comprising the steps of: transmitting a call request signal from the portable unit to a base unit; receiving the call request signal at the base unit; using the base unit to place a call to a telephone number of the emergency response center in response to the call request signal, which may include the telephone number; storing at least a first voice message in the system indicating the status of the call that has been placed; and, initiating the first voice message in the portable unit in order to advise the user of the call status.

Accordingly, it is a primary object of the present invention to provide a personal emergency communication system which is simple in construction and operation, and allows a user to establish direct, two way voice communications with a preselected emergency response center, either a central monitoring station or a 911 center or a friend or family member.

Another object of the invention is to provide a communication system as described above which employs a user-carried, portable communication unit having a single, easy-to-locate call button used to initiate a call.

A still further object of the invention is to provide a communication system of the type mentioned above which provides the user with preselected voice messages that inform the user of the status of the call that has been placed to the emergency response center.

Another object of the invention is to provide a communication system as mentioned immediately above in which the user may employ the portable unit to cause functional tests be carried out in a base unit to confirm that the portable unit and the base unit are operating properly.

A further object of the invention is to provide a communication system as described immediately above which provides the user with voice confirmation that functional tests that the portable unit and the base unit have been carried out with or without satisfactory results.

A further object of the present invention is to provide a plurality of options for the user regarding mode of operation, namely, by phone, by computer or by voice. The base unit and the portable unit can be programmed either by phone, voice or computer.

These non-limiting features, as well as other advantages and objects of the invention may be better understood by considering the following details of a description of a preferred embodiment of the present invention.

BRIEF DESCRIPTION OF THE DRAWINGS

In the drawings, which form an integral part of the specification, and are to be read in conjunction therewith, like reference numerals are employed to designate identical components in the various views:

FIG. 2A is a perspective view of a portable unit forming a portion of the system showed in FIG. 1;

FIG. 2B is a perspective view of a base unit forming a portion of the system showed in FIG. 1;

FIGS. 6a and 6b is a flow chart showing the steps in programming the system by phone, voice or computer;

FIG. 8 is a general note about buttons;

FIG. 9 is a block diagram showing test modes;

FIGS. 10a and 10b are a flow diagram showing how to program and edit a monitoring station.

DETAILED DESCRIPTION OF THE PREFERRED EMBODIMENT

Figure 1:
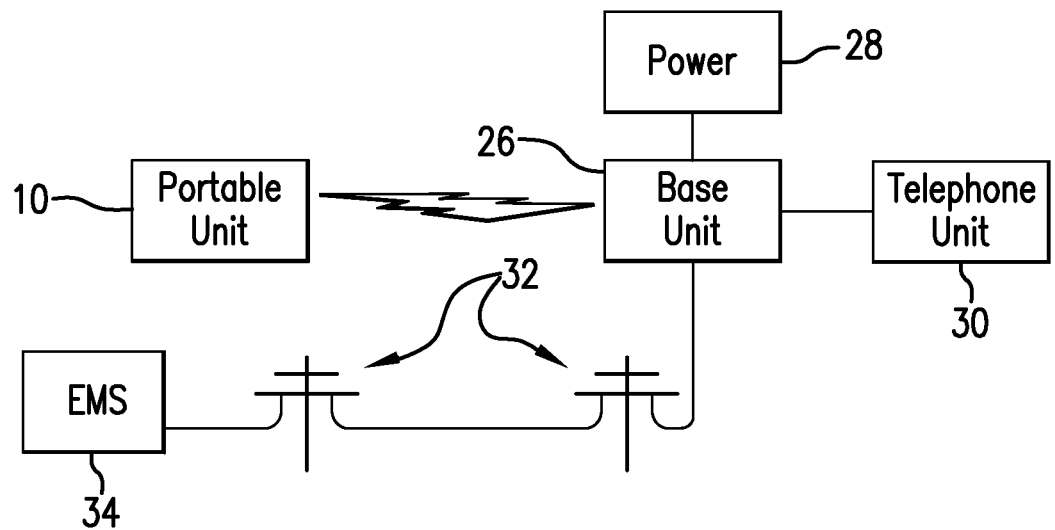
FIG. 1 is a generalized functional block diagram of a personal emergency communication system, which forms the preferred embodiment of the present invention.

Referring first to FIG. 1, the present invention relates to a personal emergency communication system broadly comprising a base unit 26 which communicates via radio frequency (RF) signals with a portable unit 10 that is either worn or attached to a user who may require emergency attention. The base unit 26 derives power from a suitable electrical power source 28, and is coupled with a public dial-up telephone network 32. A conventional telephone unit 30 may be optionally coupled to the base unit 26 in order to provide normal access to the telephone network 32 and for programming. As will be described later in more detail, the base unit 26 functions to place the portable unit 10 in two way voice communications via the telephone network 32 with an emergency response center, herein illustrated as an emergency medical service (EMS) center 34 or friend or family member.

Alternatively, the base unit can be coupled to a computer, and may in either case, be voice activated.

Figure 3:
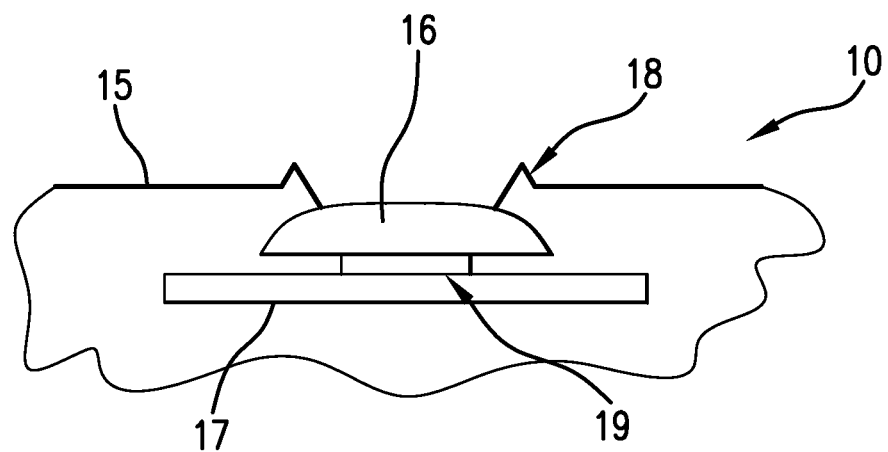
FIG. 3 is a fragmentary, cross-sectional view taken through the outer face of the unit shown in FIG. 2, to better reveal the recessed position of the call button.

Reference is now made to FIGS. 2A, 2B and 3 which depict the physical details of the portable unit 10 and base unit 26. Unit 10 comprises a generally rectangular case or housing 15 having dimensions small enough to permit the unit to be held in a user's hand, as shown in FIG. 2. The case 15 may be formed of any suitable material such as plastic, aluminum or titanium and, significantly, includes appropriate gaskets, o-rings or other suitable seals to assure that the unit 10 remains water tight when subjected to brief immersion in water. By this feature, the user may wear the unit 10 while bathing without fear of damage to the unit. The case 15 is provided with a mounting loop 14 formed on one end thereof. A lanyard or ribbon (not shown) is removably attached to the case 15 by means of a clip attached to the loop 14. The portable unit 10 may be worn as a pendant with the lanyard looped around the user's neck. Alternatively, the case 15 may be provided with a clip (not shown) for removably attaching the unit 10 to the user's belt or other article of clothing.

The unit 10 further includes a waterproof acoustic transducer or speaker 22 behind grill 22a with downward oriented slates to enable water to drain and a waterproof microphone behind slot 23. A hole 21 in housing 15 enables water to drain from the housing. The speaker 22 and microphone are readily available commercial devices, similar to what is used in common cell phones and preferably has dimensions and performance such that the user can clearly hear a voice produced by the speaker 22 at a distance of at least 15 inches. Either of the units 10 or 26 can contain a speech synthesizer and memory for storing massages and regenerating them for playback through the speaker 22 in the unit 10 or for transmission to an emergency provider. Also the unit 10 can be voice controlled. Further, the base unit 26 can be voice controlled as well.

The present invention provides a device that will enable a person with medical or safety concerns to call preselectedly a central monitoring station or a 911 operator in an emergency situation, (accident, fall, illness, or danger) and speak directly with the emergency operator without having to be near a phone, saving precious time during a crisis. This device can also be programmed to call first a family or friend number and only call the emergency responder in the event the family or friend number does not answer or does not respond correctly to the call. It has two pieces: a portable unit (pendant) 10 to wear around the neck, clipped to a belt, or wear on one's wrist. A base unit connects to any phone receptacle in the house. The function will be similar to a cordless phone. The base unit 26 should have two jacks in the back, one will connect the base unit to a wall phone outlet (the first jack of the phone line entering the house) with a phone cord and the other one is used if a customer wants to plug in a normal phone into it to make normal phone calls.

A pair of LEDs 20 and 21, red and green, respectively, in the form of light bars, is provided is provided in the face of the case 15 to provide the user with a visual indication of certain later discussed operating functions, such indicating that the unit 10 has been activated to initiate a call. Although two LEDs are described, it is possible to include more than two LEDs. Also, whereas the colors green and red are described, other color LEDs or multicolor LEDs can be used. A test button 24 is provided near the bottom of the case 15 to allow the user to test the unit's battery strength and to interrogate the base unit 26 to determine whether certain base unit operating systems are functioning properly.

A hemispherical call button 16 is recessed into a central opening in one face of the case 15 and is surrounded by an upstanding, ring shaped ridge 18. Recessing the call button 16 within the case 15 reduces the possibility of inadvertent button actuation while also providing a tactile surface feature in the case 15 that allows the user to more quickly locate the call button 16. The upstanding ridge 18 also assists in avoiding unintended button actuation. The face of the button has raised bumps or projections 19 arranged in a Braille readable pattern. As shown in FIG. 3, button 16 includes a projection 19 on its lower face which is displaced downwardly by movement by the button 16 to actuate a switch or similar device mounted on a printed circuit board 17. A test button 24 is mounted in the rounded region at the bottom of the case 15. Alternatively, button 16 can control a known membrane switch.

To synchronize the pendant 10 and base unit 26, the "RESET" button on the base unit 26 is pressed for ½ seconds. The red "Phone Line Out" LED will come on. The "PANIC" button 16 and the "BATTERY TEST" button 24 on the pendant 10 are pressed and held together until the red LED will go out on the base unit 26. After a few seconds, the pendant will give a voice announcement "System check, all functions are OK". This indicates the pendant and base unit are synchronized.

There are in-use indications on the pendant of the current status or condition. As described, there are lights consisting of two light bars that will glow in RED and GREEN depending upon the condition being displayed. Other color can be used for the LEDs. A red light will turn on whenever the portable unit has been activated and will remain on during the user's conversation with the emergency operator. All test modes are displayed in green. In addition, there are voice announcements for the purpose of enhancing user confidence during an emergency. The voice announcements indicated below will be heard.

Dialing: "Your emergency call is now being dialed. Please stand by" This message will be repeated until the pendant is ready for talking. If it is called to a family or friend number or 911, this announcement will stop when the base unit start dialing the number, user will be able to hear the dial/ring tone. Turning off: If user presses the TEST button during talking, the phone will be reset and give a voice announcement "Help is on the way, Pendant is turning off". If user presses TEST button before or while the base unit is dialing the number, the phone will be reset and give a voice announcement "Pendant is turning off".

There is a line seizure feature in the system. If someone is using a normal phone that is connected to the base unit, and the user presses the emergency button 16 on the pendant, the base unit 26 will cut-off the normal phone and takes the line for emergency calling right away. For this function to work it is necessary that the base unit is plugged into the first jack of the telephone line entering the house or location of the base unit.

Power to the base unit is established from the home power mains; however, there is a back up battery in base unit 26. The back up battery for the base station provides power for a minimum of 30 hours in the event that the electricity has failed in the home. When the base unit is powered on, a Green LED 27 will remain on all the time. When the base station looses power a RED LED 28 will flash indicating the base station has lost electrical power. When the battery in the base station reaches minimum power required for operation, the Red LED will REMAIN ON telling the user that the system is no longer operational until power is restored. Once power is restored and the battery recharges the Red LED will go out and the Green LED will remain on.

Also there is a tone alarm in base unit 26 that is actuated by Setup button 29 or actuated automatically that will sound when power is out or the phone line is out. The LED that lights for "power on", will extinguish when power is out. The tone alarm gives an audible indication, such as a buzzing produced by an audible alarm of the piezo type, located in the base unit. The alarm tone will sound in the below situations, (i) AC power is off, (ii) battery power is low or (iii) the telephone line is disconnected. When the base unit 26 is alarming, if the user presses the Setup button 29 on the base unit 26, the alarm will stop.

For the base unit to dial a number, the following procedure is used. The device can be programmed for dialing up to 5 phone numbers. #1 to #4 are family or friends phone numbers. The #5 is either 911 or the central monitoring station phone number, depending on how the system is programmed during setup. Both options are available as this makes the system more versatile, since it may be more desirable to use one type of responder rather than the other type depending on location and circumstances and comfort level. If a Central Monitoring Station is being used, the user or programmer must know the special security code associated with the CMS. This special security code is needed to program the telephone number of the CMS. A sixth Factory default number is left for an ID that is used for the calls to the central monitoring station when that program aspect is selected. When the pendant emergency button 16 is pressed, the system will call the first phone number programmed. If the phone number is blank, the system will ignore it and step to call the next # programmed. If all family or friend number locations are blank, the system will call the central monitoring station number or 911 depending on how the system is programmed by the user or the factory or factory representative. If the family or friend number locations are used, and the family or friend number is dialed, the system will look for #5 to be pressed on the dial by the family or friend member answering the call. #5 must be pressed within 30 seconds of the initiation of the emergency call. Meanwhile, the system will keep continuously sending a voice message originating in the base unit to the receiver family or friend member during this period "This is an emergency alarm phone call; please enter your pass code". If the correct pass code is entered, voice mode for talking will be connected. If #5 on the dial of the responder (friend or family member called) is not pressed within 30 seconds, or if no one answers or #5 is not pushed within 30 seconds from dialing the number, the system will forthwith call the central monitoring station or 911 as programmed. Before the 30 seconds limit is reached, the user can cancel the call by pressing the battery test button 24 on the pendant. Then, the system will call to the next phone number programmed.

The portable unit 10 is powered by an electrical battery, preferably comprising one or more replaceable lithium battery cells. A common lithium battery will normally provide unit 10 with at least 6 months of operability on a standby basis, and will be sufficient to provide a minimum of 30 minutes of uninterrupted conversation. Other types of batteries can be used and a rechargeable battery can be used.

As will be discussed later, the portable unit 10 includes a radio frequency transmitter and a receiver provided with an antenna that is contained completely inside the case 15.

The base unit 26 is illustrated in FIG. 2B and consists of a case that defines a recess or pocket 31 for holding the portable unit when not in use. The pocket can be fitted with contacts so that if the Pendant has a rechargeable battery, charging can be effected via the base unit.

Figure 4:
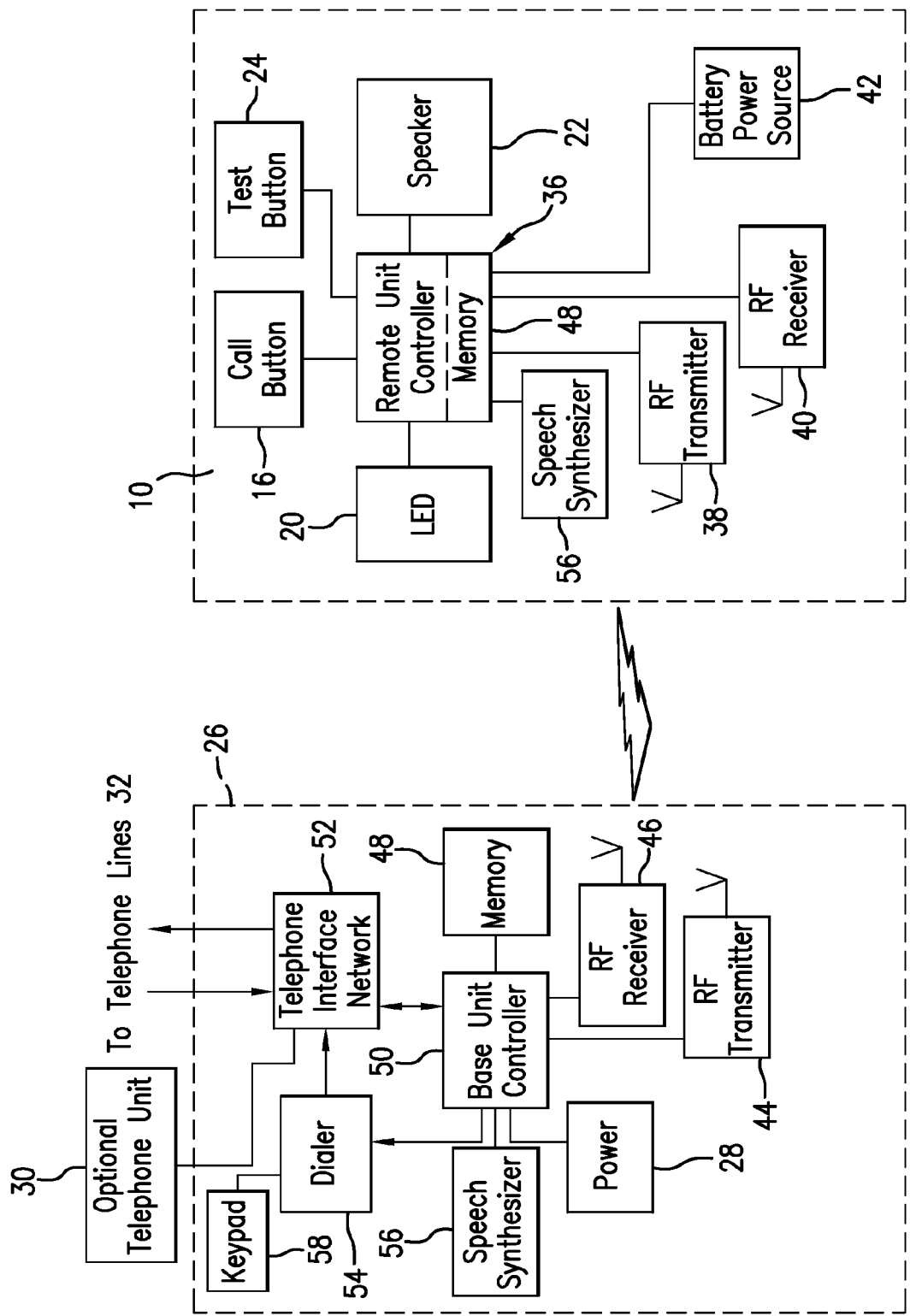
FIG. 4 is a functional block diagram showing the details of the portable unit and the base unit depicted in FIG. 1.

Reference also now made to FIG. 4 which depicts further details of the portable unit 10 and the base unit 26. Broadly, the portable unit 10 includes a remote unit controller 36 including memory 48 which may comprise a suitable microprocessor IC including a memory for controlling various operations of the unit 10. The call button 16 and the test button 24 form inputs to the controller 36, while speaker and microphone 22 and LED 20 receive output signals from the controller 36. The controller 36 also controls the operation of a speech synthesizer 56, a radio frequency transmitter 38 and a radio frequency receiver 40 which, if desired, may be combined into a single radio transponder. The transponder may be any of various commercially available radios operating, for example, in the 800-900 MHz spectrum or any approved or commercially available band or spectrum in any specific country.

Actuation of the call button 16 by the user results in the controller 36 turning on the red LED 20 and generating a call request signal that is wirelessly transmitted to the base unit 26 by the RF transmitter 28. The LED 20 provides the user with visual confirmation that a call request signal has been transmitted to the base unit 26. The RF receiver 40 receives incoming RF signals from the base unit 26 which are processed by the controller 36. Incoming signals containing voice communications are delivered to the speaker 22. The controller 36 preferably includes a time delay circuit which prevents the call request signal from being generated unless the call button 16 is depressed for at least a preselected amount of time, for example, one-half second. This feature prevents a call from being initiated to 911 or a central monitoring station as a result of inadvertent, momentary activation of the call button 16.

The user will wear the pendant around the neck, clipped to a belt, or wear on one's wrist. The pendant is not powered until a central button (call button 16) is pressed. The button is located in the center of the unit. It is in red and has in Braille the symbol for "HELP" in relief. The button is recessed to avoid accidental pressing. To further lessen the chance of unwanted activation, the button must be depressed for a minimum of ½ second to turn the unit on. If there is an accidental, unwanted activation, the user will still have the ability to speak directly into the pendant and alert the central monitoring station operator to the accidental call or press the cancel/test button 24 on the bottom of the pendant. In an emergency, the user activates the pendant by pressing the central button 16. This turns on the pendant and initiates the emergency call to the central monitoring station.

When activated, the pendant 10 transmits to the base unit 26. The base unit 26 then automatically dials the programmed number. Upon activation, the function is similar to any other cordless phone with the following exceptions:
The pendant
There is no keypad on the pendant or the base unit—so the unit can only call 911 or the central monitoring station, as programmed or friend or family.
The speaker in the pendant must be loud enough to be heard at a distance of 15" (75 dB)
The battery in the pendant is not rechargeable, but a rechargeable battery can be used. It uses a replaceable Lithium photo cell 123, but any other suitable battery providing the necessary voltage can be used.
The Pendant is water resistant. If the user is hearing impaired or is unable speak loudly, the unit can be held closer to the user's ear and/or mouth.

When the user depresses the test button 24, the controller 36 performs a test to determine the strength of the battery power source 42. If the remaining battery strength is above a threshold voltage, the controller turns on green LED 21 for one second to provide the user with a visual indication that a test is being conducted and the battery strength is adequate. A message is sent to the speaker of the remote unit 10 "Battery OK". If the battery is low, the green LED 21 will flash twice in the one-second period and the message will be "Replace battery soon". If the battery should be replace immediately, the LED will not light or flash and the message will be "Replace battery now".

When the user depresses and holds down the test button 24 for a longer, preselected time period, for example three seconds or more, the controller 36 causes a test request signal to be wirelessly transmitted to the base unit 26. A request signal is received at the base unit 26 and a base unit controller 50 causes functional tests to be performed on certain operating systems of the base unit 26. Upon successful completion of the base unit 26 functional tests, a preselected voice message is generated in a speech synthesizer and delivered to the speaker 22 in the portable unit 10 and is announced by the speaker 22 to alert the user that the test was successful and that all systems in the base unit 26 and portable or remote unit 10 are operating properly. More specifically, when the battery test button 24 is held down for 3 seconds, the pendant will give a voice announcement "System check, please standby". The Pendant will send a test signal to the base unit to confirm all functions are working properly. This will also confirm the pendant is within acceptable range of the base unit. When the test mode is active, the green status LED 21 will flash at a rate of 2 times per second continuously until the audio announcement confirms all functions are OK. A voice announcement will be played on the pendant stating the following: "System check. All functions are OK." When the system test is completed, the pendant will return to standby mode, and will be (for all practical purposes) OFF. If one of the parameters under test fails, an announcement will say: "System test failed." If the battery test button 24 is pressed during a call the pendant will hang up the call.

The base unit 26 includes an RF transmitter and receiver, 44, 46, which communicate with the remote unit 10. The base unit controller 50 may comprise a commercially available microprocessor which controls various functions of the base unit 26, including the transmission and reception of RF signals between the base unit 26 and the remote unit 10. The base unit 26 includes a suitable power source which may comprise an AC adapter that can be plugged into an ordinary electrical wall outlet. A memory 48 is provided in the system and may be in either the unit 10 or the unit 26. It is shown here in unit 26. As described above, the memory 48 is provided to store information, such as, telephone numbers of one or more emergency responders. One or more voice messages also may be stored in the memory 48 or in a separate memory, such as in a speech synthesizer contained in the unit 10 or unit 26. As shown, the messages are recalled by the controller 50 and are delivered to a speech synthesizer 56 which may comprise a commercially available "speech chip" having approximately 10 seconds or more of play time. A speaker and microphone are connected to the controller 50. The base unit 26 includes a telephone interface network 52 which interfaces the base unit 26 with a public telephone network shown as telephone lines 32. Controller 50 operates a conventional dialer 54 which produces DTMF (Dual Tone Multiple Frequency) signals that are delivered through the interface network 52 in order to place a call through the telephone lines 32. An optional key pad 58 may be employed to manually input call numbers to the dialer 54 or into the memory 48. A computer may be connected to the base unit 26 via a USB connection or a router, wireless or hardwired, so the computer can recognize the base unit. As described above programming of the base unit is usually done via a telephone plugged into the base unit.

As previously mentioned, a conventional telephone unit 30 may be optionally connected to the telephone interface network 52 by way of an input port provided in the base unit 26.

The portable unit 10 is powered by an electrical battery, preferably comprising one or more replaceable lithium battery cells. A common lithium battery will normally provide unit 10 with at least 6 months of operability on a standby basis, and will be sufficient to provide a minimum of 30 minutes of uninterrupted conversation.

As will be discussed later, the portable unit 10 includes a radio frequency transmitter and a receiver provided with an antenna that is contained completely inside the case 15.

Figure 5:
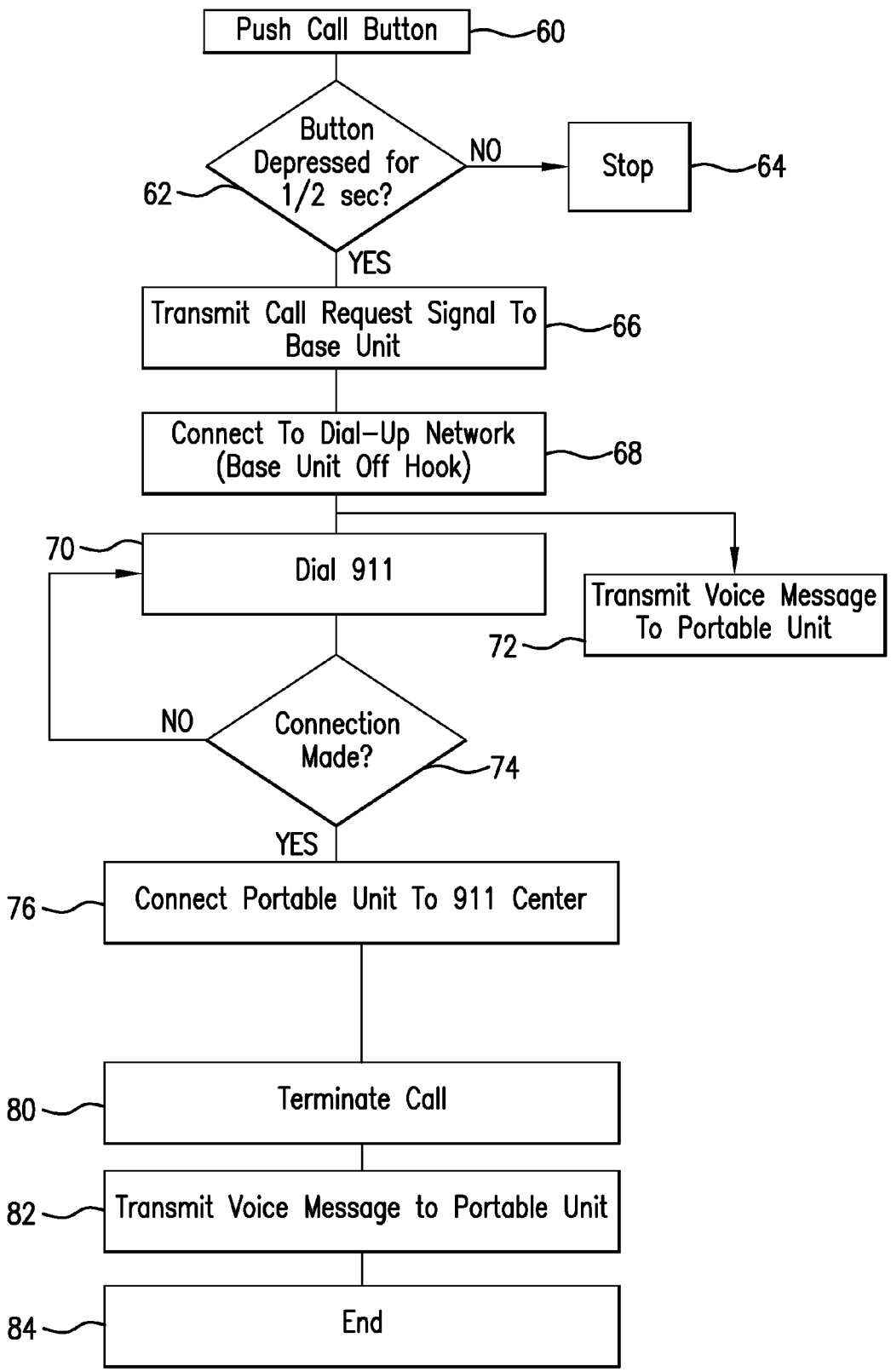
FIG. 5 is a flow chart showing the steps in placing a call to a 911 center using the communication system of the present invention.

Referring to FIG. 5, the general operation of the communication system for operation by phone will now be described. Prior to an emergency that warrants activation of the system, the portable unit 10 is in an inactive, standby mode, and the base unit 26 is "on hook" which means that the base unit 26 is also standing by and has not yet made an active connection with the telephone line 32. In the event of an emergency in which the user requires personal assistance, the user presses the call button 16 at step 60. If the call button 16 is depressed for at least a certain predetermined length of time at 62, a call request signal is generated by the portable unit 10 and transmitted to the base unit 26. If, however, the call button is depressed for a shorter length of time, then the call process is stopped at 64.

As shown at step 68, upon receipt of the call request signal at the base unit 26, the controller 50 retrieves the telephone number of an emergency response center from memory 48 or a like memory in the portable unit 10 and instructs the dialer 54 to dial the number, as is shown at step 70. Simultaneously, controller 50 retrieves a voice message from memory 48 or a like memory in the portable unit 10 which is processed by the speech synthesizer 56 or a like speech synthesizer in the portable unit 10 and used to generate a voice message in the speaker 22 in the portable unit 10. This voice message may comprise "Your emergency call is now being dialed. Please standby" is announced through the speaker 22, thereby giving the user audible voice confirmation that the call is being placed.

As shown at step 74, if a connection is not made, the dialing sequence is repeated, otherwise a connection is made, and the base unit controller 50 connects the emergency center operator with the portable unit 10, as shown at step 76, thereby placing the user in direct, two way voice communication with the emergency center operator. At this point, the user may give the emergency center operator information concerning the nature of the user's emergency, his location and other important information. The connection between the user and the emergency operator continues until such time as 911 or the central monitoring station hangs up. Then, the controller 50 directs the telephone interface network 52 to terminate the call at step 80. Then, as shown at step 82, the controller 50 retrieves a pre-selected voice message from memory 48 and causes a speech synthesizer 56 to produce a voice message or activates a voice chip that transmits to the portable unit and plays through the speaker 22 to alert the user that the call is being terminated, or retrieves the message from a memory in a speech synthesizer in the portable unit 10. This message may comprise, for example, "help is on the way." Upon termination of the call, the base unit 26 returns to its standby "on hook" status, the portable unit 10 likewise returns to its standby mode until another call is initiated by the user, and the sequence of events ends at 84.

The telephone number can be stored in a memory in the portable unit 10 and sent to the base unit 26 as part of the call request signal. Similarly, the voice messages can be stored in a memory or speech synthesizer in the portable unit 10 and activated by appropriate signals from the base unit 26 correlated with activation of the voice messages stored in the memory or speech synthesizer in the portable unit 10. Upon retrieval of each voice message in the portable unit 10, it is processed and passed to the speaker 22 in the portable unit 10 where it is announced. Also, the telephone number can be stored in a memory in either or both the portable unit 10 and the base unit 26. The voice messages can also be stored in either or both the portable unit 10 and the base unit 26, or shared between them in any manner desired.

The foregoing is a generalized description. There now follows a more detailed description of the present invention.

Figure 11:
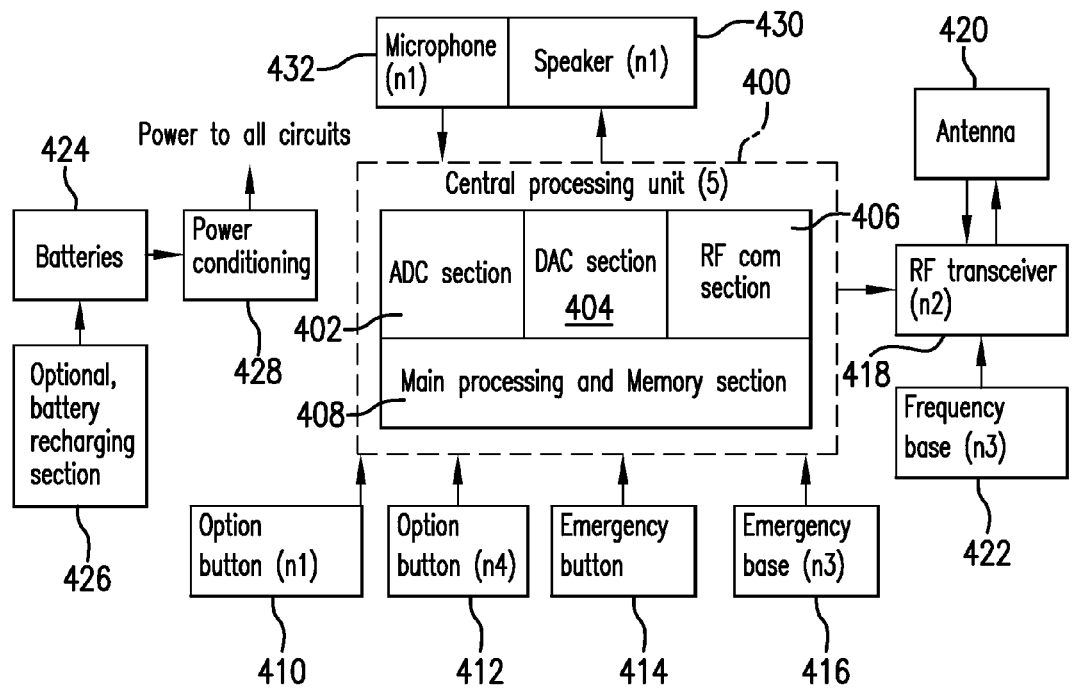
FIG. 11 is a block diagram of a preferred embodiment of the remote unit.
Figure 12:
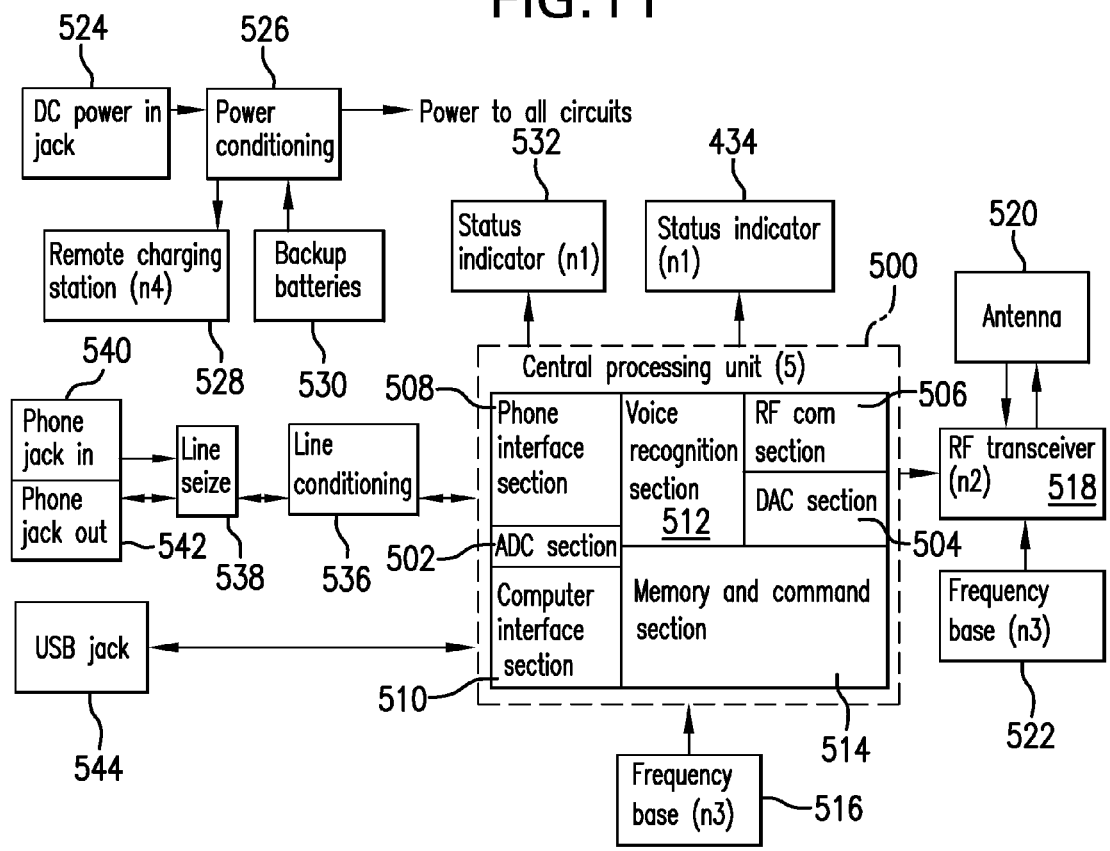
FIG. 12 is a block diagram of a preferred embodiment of the base unit.

A block diagram of the novel system is shown in FIGS. 11 and 12. The block diagram of the remote is shown in FIG. 11 and the block diagram of the base unit is shown in FIG. 12. As shown in FIG. 11, a central processing unit 400 contains an ADC section 402, a DAC section 404, an RF communication section 406, and a main processing and memory 408. The sections of the central processing unit 400, see note 5 may utilize multiple components. Coupled to the central processing unit are three button options 410, 412 and 414 and a frequency base 416. The output of the central processing unit is coupled to a RF transceiver 418 which outputs via an antenna 420. A frequency base 422 is coupled to the transceiver 418. Power is provided by batteries 424 with optional charging capability 426. Power is provided to all circuits via power conditioning 428, as is common in the art. Also connected to the central processing unit 400 are a speaker 430 and a microphone 432.

The block diagram of the remote, see FIG. 11 only shows the main functional areas and connections. Other aspects and details of the circuitry will be readily apparent to those of ordinary skill in the art from the content and function of each block as written into the block, and from the programming, use and functions as described hereinafter regarding FIGS. 6*a* and *b* to 10. For simplicity, there are many control lines to and from the functional blocks that are not shown. Notes for the block diagram shown in FIG. 11 include:

The block diagram of the base unit is shown in FIG. 12. Only main functional areas and connections are shown. There are many control lines to and from the functional blocks that are not shown. The content and function of each block will be fully understood from the programming, use and functions as described hereinafter regarding FIGS. 6*a* and *b* to 10. As shown in FIG. 12, The base unit has a central processing unit 500 contains an ADC section 502, a DAC section 504, an RF communication section 506, a phone interface section 508, a computer interface section 510, a voice recognition section 512 and a main processing and memory 514. The sections of the central processing unit 500, see note 5 may utilize multiple components. Coupled to the central processing unit 500 is a frequency base 516. The output of the central processing unit 500 is coupled to a RF transceiver 518 which outputs via an antenna 520. A frequency base 522 is coupled to the transceiver 518. Power is provided by a DC power in jack 524 that is coupled to a power conditioning circuitry 526 that outputs to all circuits and to a Remote charging station 528. Backup batteries 530 are also coupled to the power conditioning circuitry 526. The central processing unit 500 is also connected to two status indicators 532 and 534, one showing RED and one showing GREEN, as previously described. The central processing unit 500 is also coupled to a line conditioning circuitry 536 that in turn is coupled to a line seize circuitry 538, which is coupled to a phone in jack 540 and a phone out jack 542. The central processing unit 500 also is connected to a USB jack 544.

Notes for the block diagram shown in FIG. 12 include:

(n1) There may be multiple visual and/or audible status indicators.

(n2) The RF transceiver shall operate in approved frequency bands.

(n3) An external frequency base may be optional depending on actual electronic component requirements.

(n4) An optional battery charging station for remotes with re-chargeable batteries can be provided.

(n5) Sections of the central processing may utilize multiple components.

Figure 6B:
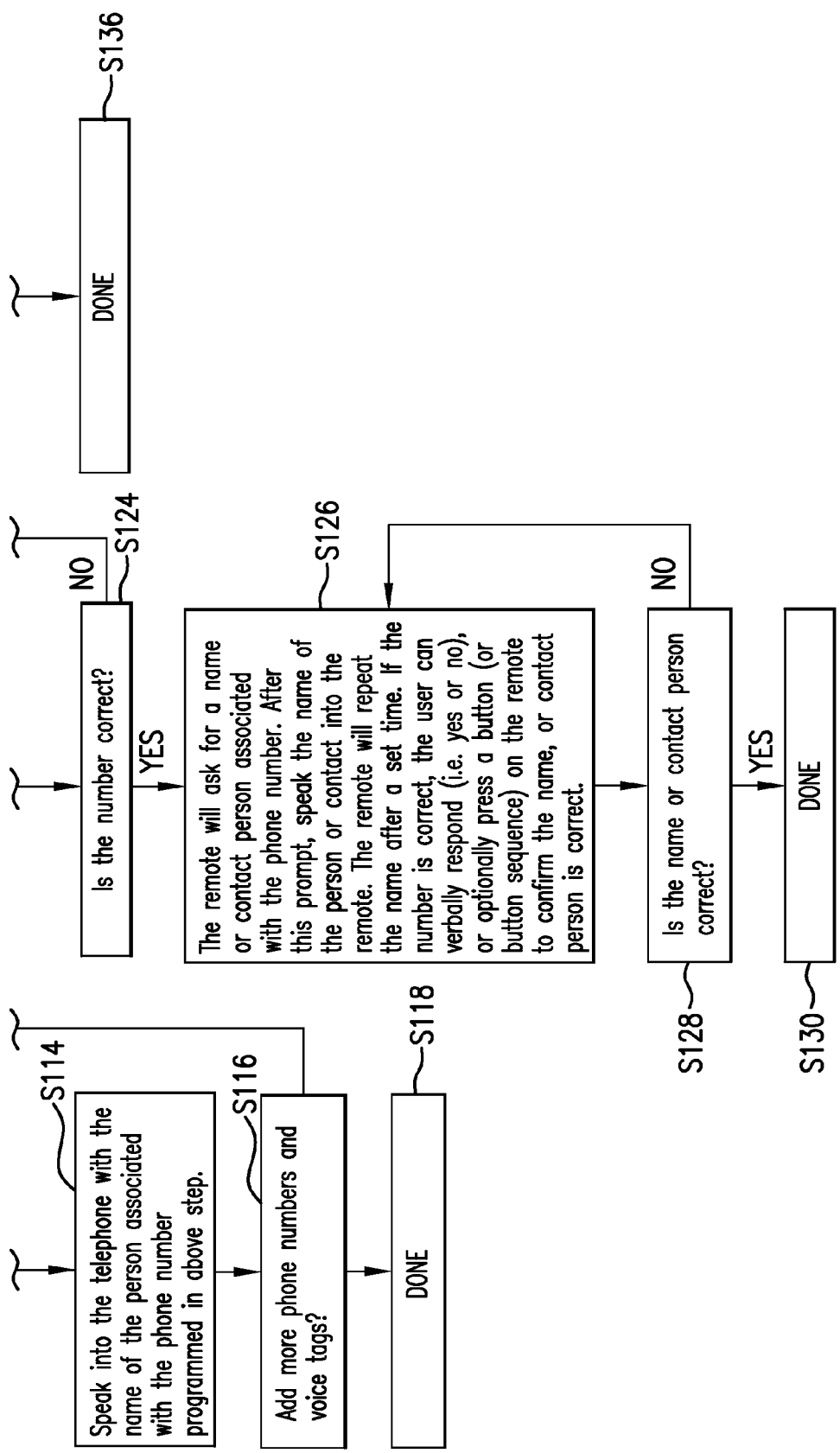

Referring now to the flow charts of FIGS. 6*a* and *b* to 10, the flow chart of FIGS. 6*a* and 6*b* shows the three options for establishing or setting-up of the novel versatile system operation regarding programming and editing of phone numbers. The programming and editing of phone numbers is initiated in step S100. In step S102 the base unit is powered by connecting the power supply to a household power outlet, and verifying that the remote or pendant batteries are OK. In step S104 a programming method is chosen. If the chosen programming method is by phone, then in step S106 the base unit is connected to a standard DTMF telephone via the phone "in" port on the base using a standard phone cord. Next in step S108, on the telephone, enter a special key sequence that will put the base in a learn phone number mode. To delete an entry, a different key sequence is used. In step 110 enter the phone number that you want the base to call. In step 112, on the telephone, enter a special key sequence that will put the base in a learn voice mode. In step S114 speak into the telephone with the name of the person associated with the phone number programmed in above step S112. In step S116 add more phone numbers and voice tags? In step S118 the programming by phone is DONE, If the programming and editing is by voice, then in Step S120 (optional) on the remote, using a combination of the buttons, and timing, will put the unit into a learn phone number mode. A different combination of buttons is used to delete stored numbers and contact info. In step S122 speak the phone number into the remote. When done, after a set time, the remote will respond with a message, and repeating the phone number. If the number is correct, the user can verbally respond (i.e. yes or no), or optionally press a button (or button sequence) on the remote to confirm the phone number is correct. In step S124 the inquiry is made "Is the number correct?". If YES, then in step S126 the remote will ask for a name or contact person associated with the phone number. After this prompt, speak the name of the person or contact into the remote. The remote will repeat the name after a set time. If the number is correct, the user can verbally respond (i.e. yes or no), or optionally press a button (or button sequence) on the remote to confirm the name, or contact person is correct. Next in step S128, the inquiry is made, "Is the name or contact person correct?". If the answer is YES, then in step S130 the programming is DONE. If the answer to the inquiry in step S124 is NO, then the program jumps back to step S122. If the answer to the inquiry in step S128 in NO, then the program jumps back to step S126.

If the programming and editing is by computer, then in step S132, (optional) the base unit is connected to a computer using a USB cable from the USB port on the base unit. Next in step 134, a special program can be used that is installed on the computer, and provides fields where the user can type in contact phone numbers and associated names, and delete such contact info. This information can be downloaded into the 911 system via the USB cable. The program communicates with the system and provides a confirmation sequence that allows you to test that each name entered is recognized and associated with the correct phone number. When completed, in step S136 the programming is DONE.

Figure 7A:
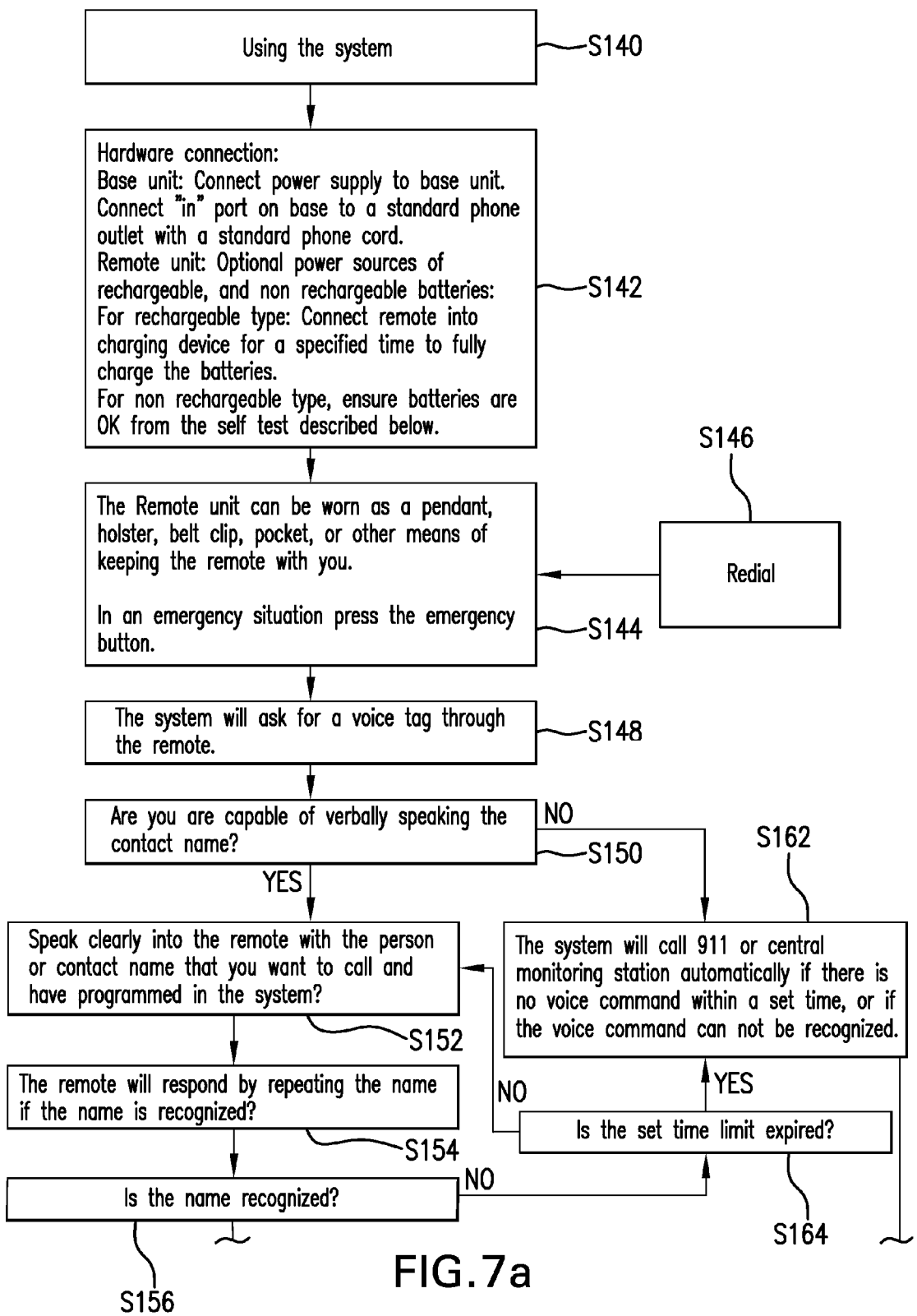
FIGS. 7a and 7b is a flow chart showing the steps of using the system.
Figure 7B:
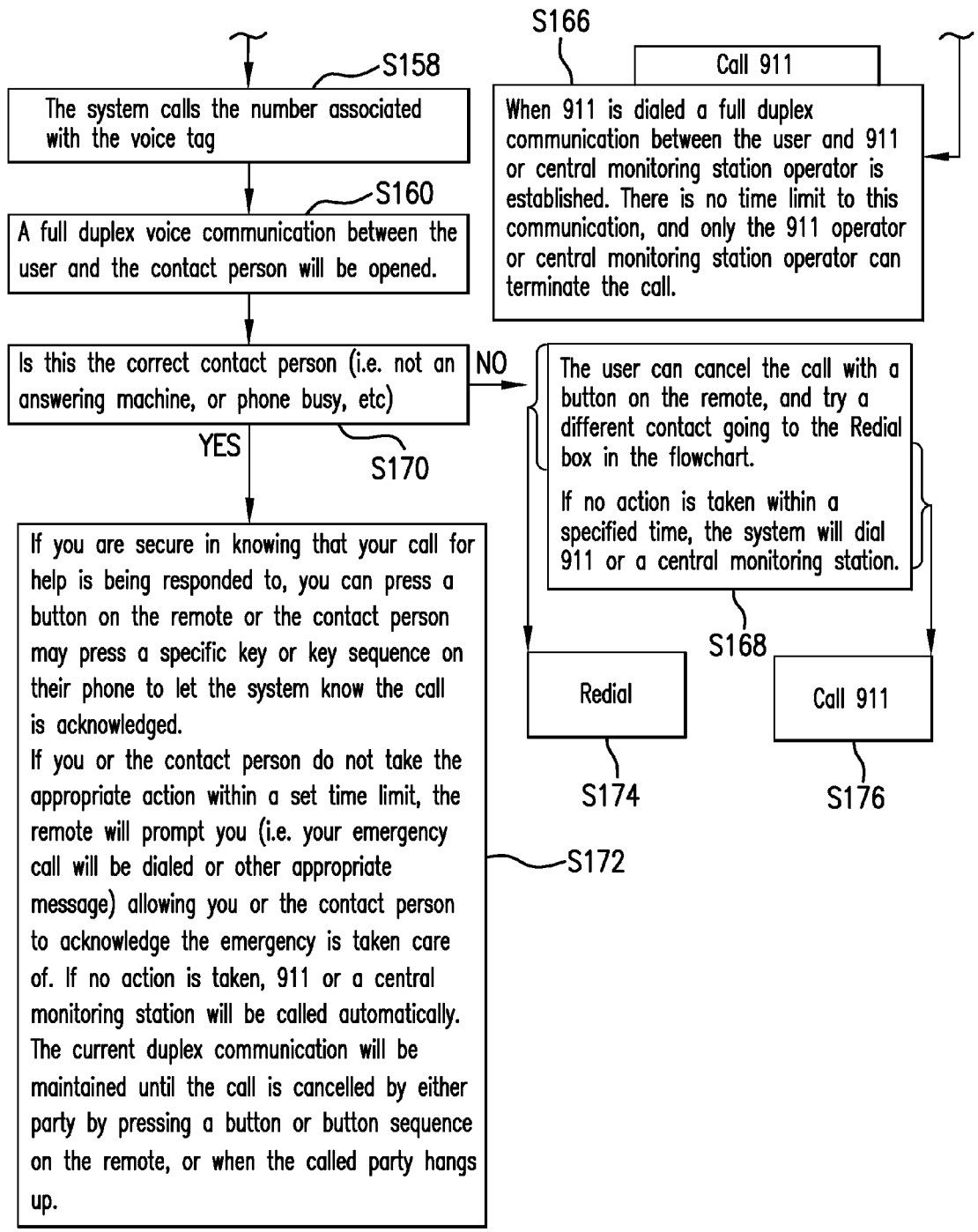

In FIGS. 7a and 7b the program for using the system is shown in a flow chart. In step S140 the program is initialized. In step S142 the hardware connections are made by connecting the base unit to a power supply, connecting the "in" port on the base unit to a standard phone outlet with a standard phone cord, if the remote or pendant uses rechargeable batteries, connecting the remote into charging device for a specified time to fully charge the batteries, and if the remote uses rechargeable batteries then charge fully. If remote uses non-rechargeable batteries, then ensuring batteries are OK from the self test described below. In step S144, the remote unit can be worn as a pendant, holster, belt clip, pocket, or other means of keeping the remote with you. In an emergency situation press the emergency button. Step S146 is provided for redialing. In step S148, the system will ask for a voice tag through the remote. In step S150, the inquiry "Are you are capable of verbally speaking the contact name?" will be announced. If the answer is YES, then the program advances to step S152, whereupon the user will speak clearly into the remote with the person or contact name that you want to call and have programmed in the system. In step S154 the remote will respond by repeating the name if the name is recognized. In step S156 the inquiry will be made "Is the name recognized?". If the answer is YES, then in step S158 the system calls the number associated with the voice tag, and in step S160 a full duplex voice communication between the user and the contact person will be opened. In step S170 the inquiry will be made "Is this the correct contact person (i.e. not an answering machine, or phone busy, etc)?", and if the answer is YES, in step S172 if you are secure in knowing that your call for help is being responded to, you can press a button on the remote or the contact person may press a specific key or key sequence on their phone to let the system know the call is acknowledged. If you or the contact person does not take the appropriate action within a set time limit, the remote will prompt you (i.e. your emergency call will be dialed or other appropriate message) allowing you or the contact person to acknowledge the emergency is taken care of. If no action is taken, 911 or a central monitoring station, depending on programming, will be called automatically in step S166 or step S176. The current duplex communication will be maintained until the call is cancelled by either party by pressing a button or button sequence on the remote, or when the called party hangs up. If the answer in step S170 is NO, then the system will call 911 or the central monitoring station in step S166 or Step S176.

If the answer in step S150 is NO, then in step S162 the system will call 911 or central monitoring station automatically if there is no voice command within a set time, or if the voice command can not be recognized. Also, if the answer in step S152 is NO or the answer in step S156 is NO, then in step S164 the inquiry is made "Is the set time limit expired?". If YES, then the program goes to step S162 and then step S166 and the system calls the central monitoring station. When 911 or the central monitoring station is dialed a full duplex communication between the user and 911 or central monitoring station operator is established. There is no time limit to this communication and only the operator at 911 or central monitoring station can terminate the call. Before reaching a number, the user can cancel the call with a button on the remote, and try a different contact, going to the Redial step S174 in the flowchart. If no action is taken within a specified time, the system in step S176 will dial 911 or a central monitoring station.

As a general note the chart of FIG. 8 shows how buttons can be used in various ways. According to the invention, pressing a button on either the base unit or remote unit can be considered as various methods of using a single button to perform multiple functions. Example, you may press and hold a button for a specific time for one function, and press and release the button can perform another function.

The flow chart of FIG. 9 shows detailed information about the buttons and their meaning and function how they are used. In step S200 a range and system test is described, namely, by pressing a button on the remote an automatic system test will be performed and include the following: Battery condition; Range test (the distance the remote can be from the base and function reliably); and Phone line check (verifies the phone line is connected and dial tone present). The results from the systems check are reported to the user with factory programmed voice messages. In step S202 a battery test is made by pressing a button on the remote; a battery test will be performed. The results from the battery check are reported to the user with factory programmed voice messages.

A voice recognition test is performed in step S204 by pressing a button on the remote a voice recognition test will be performed. This test consists of giving the remote voice commands such as the contact names you have programmed in. The results from the test are that the remote will say the phone number that you programmed in for that name. You can confirm, or delete and reprogram the contact information if it was not recorded correctly by using the above described techniques.

The safety features of the invention included a battery back-up in the base unit that automatically switches on if the power from the power supply fails for any reason. A light on the base will indicate when running on battery back up. Phone line check is made by the base unit performing a periodic check of the phone line status. The light on the base unit will indicate if there is any failure with this test. Phone line-seizure by the base unit is accomplished by the base unit being equipped with in and out phone jacks. The out port is used to connect a standard phone. The base unit will disconnect this phone in an emergency condition. This safety feature is useful if the connected phone is off-hook for any reason.

Auto redial will be performed if the phone line is faulty when an emergency is initiated, the base unit will continue to test the line on a timed basis until a dial tone is detected (line live) and make the call. A factory recorded message from the remote will provide the user with the status.

The inventive system also has an RF carrier frequency feature. The base and remote communicate via Radio frequency within approved bands. The system can be factory field programmed for multiple frequencies within the approved band to reduce the possibility of interference if multiple 911 responders are within range of each other.

The system also has a Central Monitoring Station feature. The system can be set up by the user and/or factory programmed to communicate with an industry standard security system central monitoring station service. These types of services can provide detailed customer medical history and records. Typically these providers require a specific communications protocol that the system is capable of providing. When this option is used, the system will dial the number provided by the monitoring service in place of dialing 911, and also provide the monitoring service with a unique ID number to identify the user. All other features of the system will remain the same. The user programming procedure to allow the system to communicate with a security system central monitoring station is similar to the procedure used above to program phone numbers and names. The specific protocols used by monitoring services will be integrated into the system firmware to allow a number to be associated with the various protocols used. The difference is that when the system would normally call 911, instead the system calls the central monitoring station. To do this, the central station phone number, unique ID number, and data protocol used by the central monitoring service must be known. These items are typically provided by the monitoring station service used. Example data protocol may be 4+2, or Contact ID, or other format used in the industry.

Figure 10B:
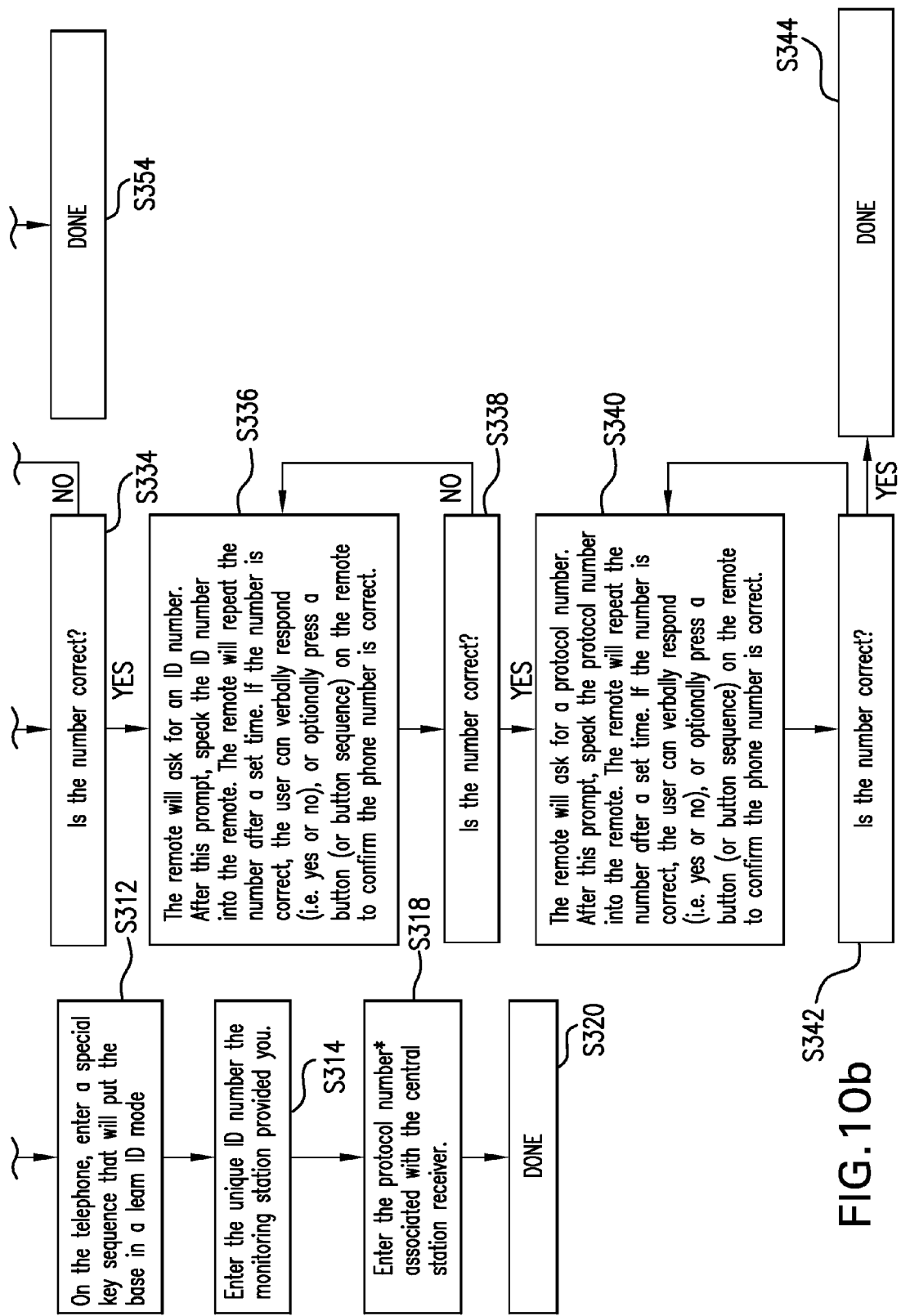

The flow chart of FIGS. 10a and 10b shows how the system would be programmed to utilize a central monitoring station instead of calling the 911 emergency number. The specific protocols used by monitoring services will be integrated into the system firmware to allow a number to be associated with the various protocols used. The flow chart of FIGS. 10a and 10b shows in detail how the novel system is used to program and edit monitor station data. The simple, self-explanatory flow chart shown in FIG. 10 shows how the system would be programmed regarding the options of one or all of, by phone, by voice or by computer utilizing a central monitoring station.

The program for programming and editing monitoring station data is initiated in step S300 is shown in FIGS. 10a and 10b. In step S302 the power to the Base unit is accomplished by connecting the power supply to a household power outlet. This step also verifies that the batteries in the Remote are OK. Next, in step S304 the user chooses a programming method. If the method chosen is By Phone, the program advances to step S306 and the Base is connected to a standard DTMF Telephone via the phone "in" port on the Base using a standard phone cord. In step S308, on the telephone, a special key sequence is entered that will put the base in a learn monitoring station data mode. To delete an entry, a different key sequence is used. In step S310 the phone number is entered of the monitoring station that you want the base to call. In step S312 on the telephone, enter a special key sequence that will put the base in a learn ID mode. In step S314 enter the unique ID number the monitoring station provided to you. In step S318 enter the protocol number* associated with the central station receiver. In step S320 the programming is DONE.

If the programming by voice is chosen, the program proceeds in step S330 on the remote, using a combination of the buttons and timing that will put the unit into a learn monitoring station data mode. A different combination of buttons is used to delete stored data. In step S332 speak the phone number into the Remote. When done, after a set time, the Remote will respond with a message, and repeating the phone number. If the number is correct, the user can verbally respond (i.e. yes or no), or optionally press a button (or button sequence) on the Remote to confirm the phone number is correct. In step S334 the inquiry is made "Is the number correct?". If NO, then the program loops back to step S332. If YES, then the program advances to step S336 where the Remote will ask for an ID number. After this prompt, speak the ID number into the Remote. The Remote will repeat the number after a set time. If the number is correct, the user can verbally respond (i.e. yes or no), or optionally, press a button (or button sequence) on the remote to confirm the number is correct. In step S338 the inquiry is made "Is the number correct?". If the answer is NO, the program loops back to step S336. If YES, the program proceeds to step S340 and the Remote will ask for a protocol number. After this prompt, speak the protocol number into the Remote. The Remote will repeat the number after a set time. If the number is correct, the user can verbally respond (i.e. yes or no), or optionally, press a button (or button sequence) on the remote to confirm the number is correct. In step S342 the inquiry is made "Is the number correct?". If NO, then the program loops back to step S340. If the answer is YES, then the program proceeds to step S344 and is DONE.

If the programming method by computer is chosen, in step S350 the Base is connected to a computer using a USB cable from the USB port on the Base unit. In step S352 a special program can be used and installed on the computer, and provides fields where the user can type in all central station information. This information can be downloaded into the 911 system via the USB cable. The program communicates with the system and provides a confirmation sequence that allows you to verify all central station required information was installed correctly. In step S354 the programming by this method is DONE.

If the base unit becomes disconnected from the phone line for any reason, the RED LED will light indicating the phone line is out and an audible alarm will sound. If user presses the Panic button 16, the unit will check for a phone line. When phone line out is determined or sensed, the Pendant will alert the user with a voice tag "No phone line present, please standby". The base unit will periodically check to see if the phone line has been restored. Once the phone line has been restored, the base unit will wake up the Pendant and call 911 or the Central Monitoring Station, depending on how programmed.

The Pendant can include a shock detector to detect or sense the Pendant experiencing a shock of a predetermined value, e.g. a shock due to the user falling down. Responsive to detecting a shock of a predetermined value, the Pendant signals the base unit, which initiates a call directly to 911 or a CMS, depending on programming. Only 911 or CMS will be called as the calling feature to friend or family member will be bypassed.

Setting up the personal emergency, family, friend communication system is described as follows. Start by unpacking the components of the system and install the base station battery into the base unit by following the instructions in the manual. Plug the enclosed transformer into a standard electrical outlet and plug the other end into the base unit which provides power to the base and charges the batteries in case of a power failure. Take the battery for the remote (pendant) and install it into the remote following the directions in the manual. Next, plug the phone cord into the home telephone outlet (the first incoming jack of the telephone line) and plug the other end into the jack marked (in) on the base unit. There is also an extra phone jack receptacle on the base unit for plugging your house phone into the base unit. There are many ways to program the system and one will need to refer to the flow charts for programming instructions of FIGS. 6a and 6b and 10a and b and reference to FIGS. 7 to 9.

The personal emergency, family, friend communication system can be configured to contact a friend or family member, 911 emergency services, or a central monitoring station or in any combination stated above. In one scenario a non life-threatening emergency, the user will simply press the emergency button on the remote. A voice prompt will be heard through the remote and will ask for a command. The user will say the name they wish to call, "Bill" or whatever friend or family member they desire. The personal emergency, family, friend communication system can then say "please stand by, your emergency call is now being dialed" or any other appropriate message. If Bill answers the call, Bill will hear a voice tag instructing him to press a button or combination of buttons to acknowledge he is taking care of the emergency, the user can then ask for assistance by speaking into the remote. If the call is unanswered, reaches an answering service (voicemail etc.), or the intended recipient does not press the correct button or combination of buttons, the default will be for the personal emergency, family, friend communication system to call 911 or a central monitoring station. The user can press a button located on the remote at any time to disconnect the current call and then press the emergency button again to call a different friend or family member.

In instances where a person is unable to speak or is having a life-threatening emergency, if they press the emergency button on the personal emergency, family, friend communication system, the system will listen for a voice tag. If no voice prompt is heard within 5 seconds or a preselected or predetermined appropriate time or is not understood, the default will always be that the personal emergency, family, friend communication system will call 911 or a central monitoring station, however programmed.

Other added features are on-board battery back up within the base unit. Line seizure, whereas when the personal emergency, family, friend communication system emergency button is activated, it will disconnect the extension phone connected to the base, plus all features as described above.

The following is a specific preferred embodiment example of the present invention described in detail, but not by way of limitation as changes and modifications can be made from the teachings herein. A base unit and pendant or remote is used as shown in FIGS. 2A and 2B, and as described above. The system is a communication system for personal health and security. The physical specifications of the devices, pendant and base unit are overall size of Portable Unit is 22 mm×50 mm×80 mm. The size of the Base is 106.29 mm×108.38 mm×69.85 mm. The pendant is water-resistant to a JIS 6 standard. The electrical specifications are an operating Frequency of 1.92~1.93 GHz (US DECT); a Range of 600 Feet Line-Of-Sight (when worn around the neck) and battery life for pendant is 6 hours talking or 9 months standby. The batteries used are Lithium photo 123 or equivalent for the pendant, and Li-Polymer 3.7V/3500 mAHIt for the Base unit.

The user will wear the pendant around the neck, clipped to a belt, or wear on ones wrist. The pendant is not powered until a central button is pressed. The button is located in the center of the unit. It is in red and put in Braille the symbol for "HELP". The button is recessed to avoid accidental pressing. To further lessen the chance of unwanted activation, the button must be depressed for a minimum of ½ second to turn the unit on. Note: If there is an accidental, unwanted activation, the user will still have the ability to speak directly into the pendant and alert the central monitoring station operator to the accidental call or press the cancel/test button on the bottom of the pendant. In an emergency, the user activates the pendant by pressing the central button. This turns on the pendant and initiates the emergency call to the central monitoring station.

When activated, the pendant transmits to the base unit. The base unit then automatically dials the programmed number. Upon activation, the function is similar to any other cordless phone with the following exceptions:
The pendant
There is no keypad on the pendant or the base unit—so the unit can only call the central monitoring station, 911 or designated emergency provider (friend or family).
The speaker in the pendant must be loud enough to be heard at a distance of 15" (75 dB)
The battery in the pendant is not rechargeable. It uses a replaceable Lithium photo cell 123.
The Pendant is water resistant. If the user is hearing impaired or is unable speak loudly, the unit can be held closer to the user's ear and/or mouth.

The system comprises apparatus that includes a device that will enable a person with medical or safety concerns to call the central monitoring station in an emergency situation, (accident, fall, illness, or danger) and speak directly with the emergency operator without having to be near a phone, saving precious time during a crisis. This device can also be programmed to call a family or friend number instead of the central monitoring station, or 911. The system has two devices: a portable unit (pendant) to wear around the neck, clipped to a belt, or wear on ones wrist and a base unit that connects to any phone receptacle in the house. The function will be similar to a cordless phone. The base unit should have two jacks in the back. one jack will connect the base unit to the wall phone outlet with a phone cord and the other one is used if the customers wants to plug in a normal phone into it to make normal phone calls.

To Synchronize the Pendant and Base unit, the user presses the "RESET" button on the base unit for 3 seconds. The Red "Phone Line Out" LED will come on. User then presses and holds the "PANIC" button 16 and the "BATTERY TEST" button 24 on the Pendant together, the Red LED will go out on the Base unit. After a few seconds, the Pendant will give a voice announcement "System check, all functions are ok". This indicates the Pendant and Base unit are synchronized.

The In-Use indication on the Pendant consists of light. 2 light bars that will glow in RED and GREEN, depending on the condition being displayed. A red light will turn on whenever the portable unit has been activated and will remain on during the user's conversation with the emergency operator. All test modes are displayed in green.

Voice announcements are made through the Pendant speaker to the user. For the purpose of enhancing user confidence during an emergency, the voice announcements below will be heard. •Dialing: "Your emergency call is now being dialed. Please stand by" This message will be repeated until the pendant is ready for talking. If it is called to a family or friend number, central monitoring station or 911, this announcement will stop when the base unit start dialing the number, and user will be able to hear the dial/ring tone. •Turning off: If user presses the TEST button during talking, the phone will be reset and give voice announcement "Help is on the way, your Pendant is turning off". If user presses TEST button before the base unit dials the number, the phone will be reset and give a voice announcement "Pendant is turning off".

The system will also make a battery test. A separate battery test button 24 is provided on the bottom of the pendant. Whenever the button is pressed momentarily, the green status LED will light for one second, indicating the battery voltage is OK and the user will hear "Battery is OK". If the battery should be replaced soon, the LED will blink two times during a one second period and the user will hear "Replace battery soon".

If the battery should be replaced immediately, there will be no LED lit and the user will hear "Replace battery now" The following are the voice announcements that will accompany the test:
"Battery is OK", or
"Replace battery soon", or
"Replace battery now."

The apparatus will also perform a system test. When the battery test button 24 is held down for 3 seconds, the pendant will give a voice announcement "System check, please standby". The Pendant will send a test signal to the base unit to confirm all functions are working properly. This will also confirm the pendant is within acceptable range of the base unit. When the test mode is active, the green status LED will flash at a rate of 2 times per second continuously until the audio announcement confirms all functions are OK. A voice announcement will be played on the pendant stating the following: "System check. All functions are OK." When the system test is completed, the pendant will return to standby mode, and will be (for all practical purposes) OFF. If one of the parameters under test fails, an announcement will say: "System test failed." If the battery test button is pressed during a call the pendant will hang up the call.

Another feature of the invention is line seizure. If someone is using a normal phone that is connected to the base unit, and user presses the emergency button on the pendant, the base unit will cut the normal phone and take the line for emergency calling right away.

There is a backup battery in the Base Unit. The back up battery for the base station that can provide power for 30 hours in the event that the electricity has failed in the home. When the base unit is powered on, a Green LED will remain on all the time. When the base station looses power the RED LED will flash indicating the base station has lost electrical power. When the battery in the base station reaches minimum power required for operation the Red LED will REMAIN On until power is restored telling the user that the system is no longer operational. Once power is restored and the battery recharges, the Red LED will go out and the Green LED will remain on.

There is a tone alarm in Base Unit. There is a buzzer in the base unit that will give an alarm tone in the following situations; AC power is off, battery power is low, and the telephone line is disconnected. When the base unit is alarming, pressing the Setup button on the base unit will stop the Alarm.

For dialing a number, the device can be programmed for up to 5 phone numbers. #1 #4 are family or friends phone numbers. The #5 is the central monitoring station phone # or 911, as programmed. The Factory default number may be left blank or can be used for ID for the central monitoring station operation. When the pendant emergency button 16 is pressed, the system will call the first phone number programmed. If the phone number is blank, the system will ignore it and just call the next # programmed. If all family or friend number locations are blank, the system will call the central monitoring station number or 911 as it is programmed. If the family or friend number locations are used, and the family or friend number is dialed, the system will look for #5 to be pressed by the family or friend member within 30 seconds of the initiation of the emergency call. And the system will keep continue sending a voice message to the receiver family or friend member during this period "This is an emergency alarm phone call, please enter your pass code". Once connected, voice mode for talking will be on, but for only 30 seconds if #5 is not pressed. If no one answers or #5 is not pushed within 30 seconds from dialing the number, the system will call the central station or 911. Before the 30 seconds limit is reached, the user can cancel the call by pressing Battery Test button 24 on the pendant. Then the system will call to the next phone number programmed.

Programming by the user is as follows. User can program family/friend phone numbers and monitor center phone numbers to the system. User also can change language of the voice message between English and Spanish by programming.

Once a monitoring center phone number is programmed, user will need to program a 4 digit user ID, and can change the periodic system check frequency (default is 7, this means for the system to check once in 7 days) This feature can be programmed to check in from every day to once a week. A normal telephone is connected to the base unit through a phone cord. Then user can program/modify the phone numbers, user ID and checking frequency this way, Pick up the handset, Press buttons *0#*. The red Phone Line LED on the base unit will light on. The user can program the phone number/ID number/checking frequency. To program phone number 1, press buttons *0#*1#, the red Phone Line LED on the base unit will flash quickly. User can then input family/friend phone number, ended with #. Then red LED on base unit will stop flashing and remain on Indicating the new phone number was stored. This operation will overwrite the original number if it was previously programmed. If user does not input a new phone number, just press # when the red LED starts flashing, the phone number will be cleared.

To program phone number 2, just press buttons *0#*2#, operate same as above.

To program phone number 3, just press buttons *0#*3#, operate same as above.

To program phone number 4, just press buttons *0#*4#, operate same as above.

To program phone number 5 central monitoring station, user needs to press buttons *0#*, enter user's 4 digit secret code and then input the central monitoring station phone number, end with #. (Please note this phone number must be the central monitoring station). As the central monitoring station usually has a security feature, it is necessary to have a 4 digit user secret code ID, which is given to the user in secret by the central monitoring station, and is programmed into number 6, see supra.

To program phone number 6, the 4 digit ID number given to a user is used, just press buttons *0#*6#ID#, operate same as above.

To program the periodic checking frequency, press buttons *0#*7#(1 to 7)#, operate same as above. Please note the valid number is a number from 1 to 7. This means the system will check with central monitoring station once a week to 7 times a week.

To change the voice message language, press buttons *0#*8#(1 or leave blank)#, follow the same above instruction. Please note the valid number is 1 (for Spanish) only. The default value is blank (for English). And after changing the language setting, you need to synchronize the Pendant with base unit to make sure the change is stored into the Pendant.

To set all the phone numbers as factory default (master reset), just press buttons *0#*9##, when the red LED start flashing, press 0# to confirm. The red LED will stop flashing and remain on. During above operation, user can exit the edit mode at anytime by hanging up the handset and the red LED on the base unit will turn off.

For making an emergency calling to the Monitor Center, the following procedure is used.

When the pendant is calling the monitor center, the system will send an emergency message to the monitor center first. That message is ACCT18110000001<cksm>. If the pendant battery is low, another message will be sent to the monitor center before user can talk with the operator. That message is ACCT18138400001<cksm>. If the AC power for base unit is off, the system will send one more message, ACCT18130100000<cksm>" to the monitoring center before user can talk with the operator. And during the conversation with monitor center operator, the operator can press 9 to end the call.

If the phone line is off when user makes a call, a voice announcement will be given as "no phone line present, please stand by". When the phone line is recovered, the base unit will wake up the Pendant and directly call to the monitor center. The Pendant will play a voice announcement "Your emergency call is being dialed, please standby". In this case, the system will also send below messages before user can talk with the operator, Telco 1 Fault—ACCT18135100000<CKSM>
Telco 1 Restore—ACCT18335100000<CKSM>

As noted, the system will make a periodic system check. The base unit will check in with the monitor station once a week to ensure that the unit still works and this feature is programmable from once a week to 7 times a week, refer to the above description of user programming. During the periodic system check, the base unit will transmit a message "ACCT18160200000<cksm>" that is a 16 digits number. "ACCT" is user ID that will be programmed by user (refer to the above description of user programming). The last digit is checksum of other digits. The protocol for communicating with monitor station refers to document "DC-05_Contact_ID1.pdf". During this periodic system check, if the AC power is off, the base unit will send one more message "ACCT18130100000<cksm>" to the monitoring center. And when the AC power is recovered, the base unit will send an AC power recover message "ACCT18330100000<cksm>" to the monitor center.

Figure 13:
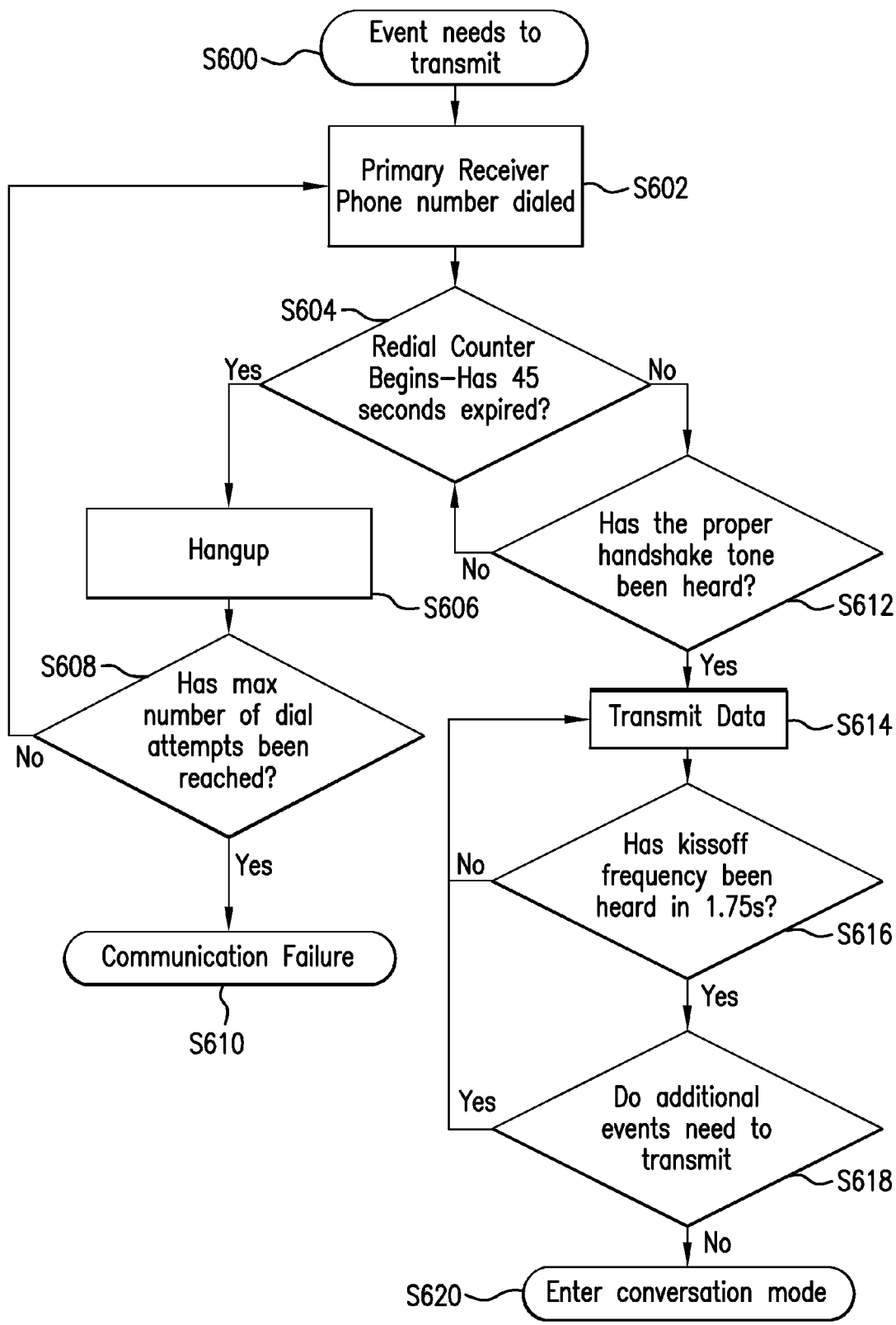
FIG. 13 is a flow chart of a specific preferred embodiment showing operation of the preferred remote and base units of FIGS. 11 and 12.

FIG. 13 shows a flow chart of the operation of the above specific preferred embodiment. In step S600 the system is initialized when an event needs to be transmitted by pushing the panic button 16. In step S602 the system dials the telephone number of the primary receiver. This starts a redial counter in query step S604 and the question is posed "Has 45 seconds expired?" If the answer is YES, the program proceeds to step S606 where the phone is hung up, and then proceeds to step S608 where the query is posed "Has maximum number of dial attempts been reached?". If the answer is YES, then a communication failure is reported in step S610. If the answer to the question posed in step S608 is NO, then the program loops back to step S602.

If the answer to the query in step S604 is NO, then the program proceeds to step S612 and the next query "Has the proper handshake tone been heard?". If the answer is NO, then the program loops back to step S604. If the answer is YES, the program proceeds to the step S614 and transmits data, and then to the query of step S616, where the questions is asked "Has kissoff frequency been heard in 1.75 seconds?". If the answer is NO, the program loops back to step S614. If the answer to the query of step S616 is YES, then the program proceeds to the query of step S618 "Do additional events need to be transmitted?". If the answer is NO, then the program proceeds to step S620 and enter the conversation mode. IF the answer to the query in step S618 is YES, then the program loops back to step S614 to transmit additional data.

Figure 14:
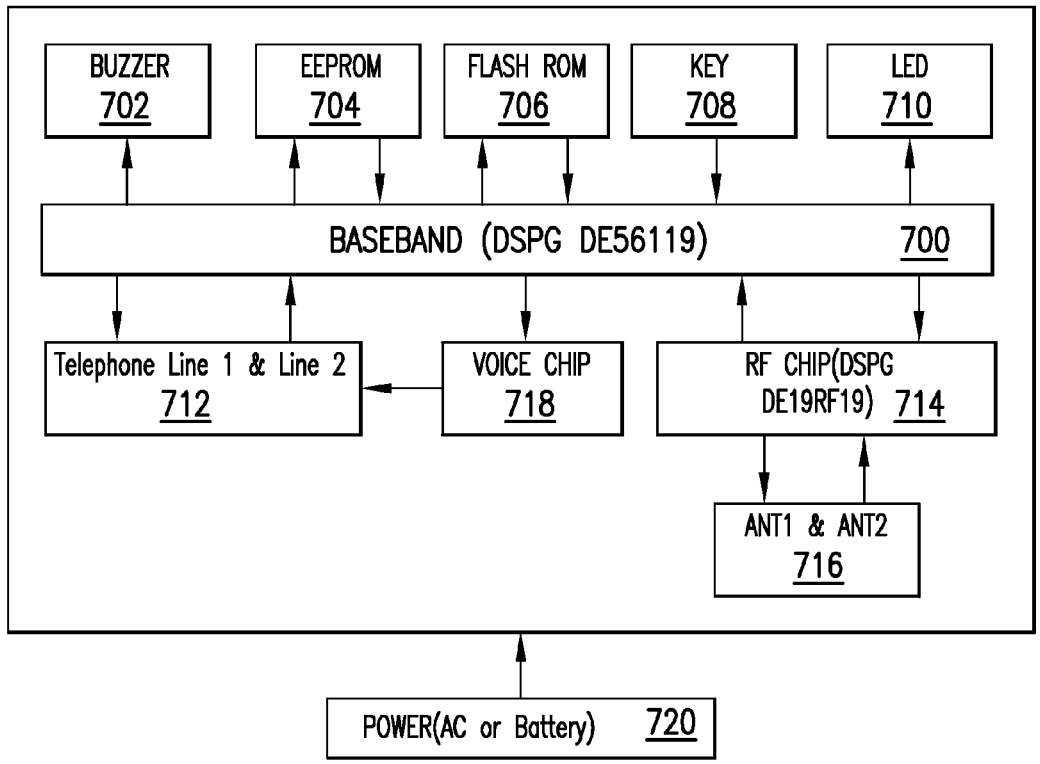
FIG. 14 is a block diagram of another preferred base unit.

FIG. 14 illustrates an overall block diagram of a base unit according to the invention which consists of a Baseband block 700 (processor and controller) (DSPG DE56119) that is connected to a buzzer 702, an EE Prom 704, flash ROM 706, key 708, LED 710, telephone lines 1 and 2 712, RF Chip 714 (ESPG DE19RF19) connected with antenna 1 and antenna 2 716, and voice chip 718. Power is supplied by AC and/or battery 720.

Figure 15:
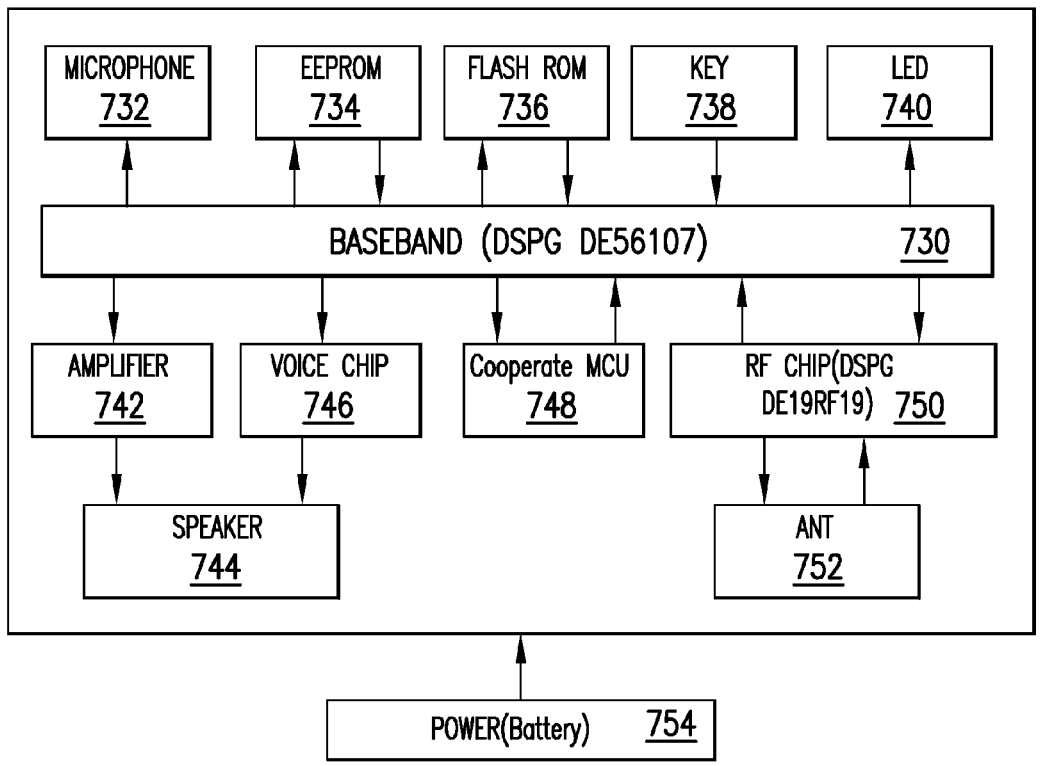
FIG. 15 is a block diagram of another preferred portable unit.

FIG. 15 illustrates an overall block diagram for the pendant that operates with the base unit shown in FIG. 14. The pendant includes a Baseband block 730 (processor and controller) (DSPG DE566107) that is connected to a microphone 732, an EE Prom 734, cooperate MCU block 748, an RF Chip (DSPG DE19RF19) 750, which connects to Antenna 752. The pendant is powered in block 754 by battery.

Figure 16A:
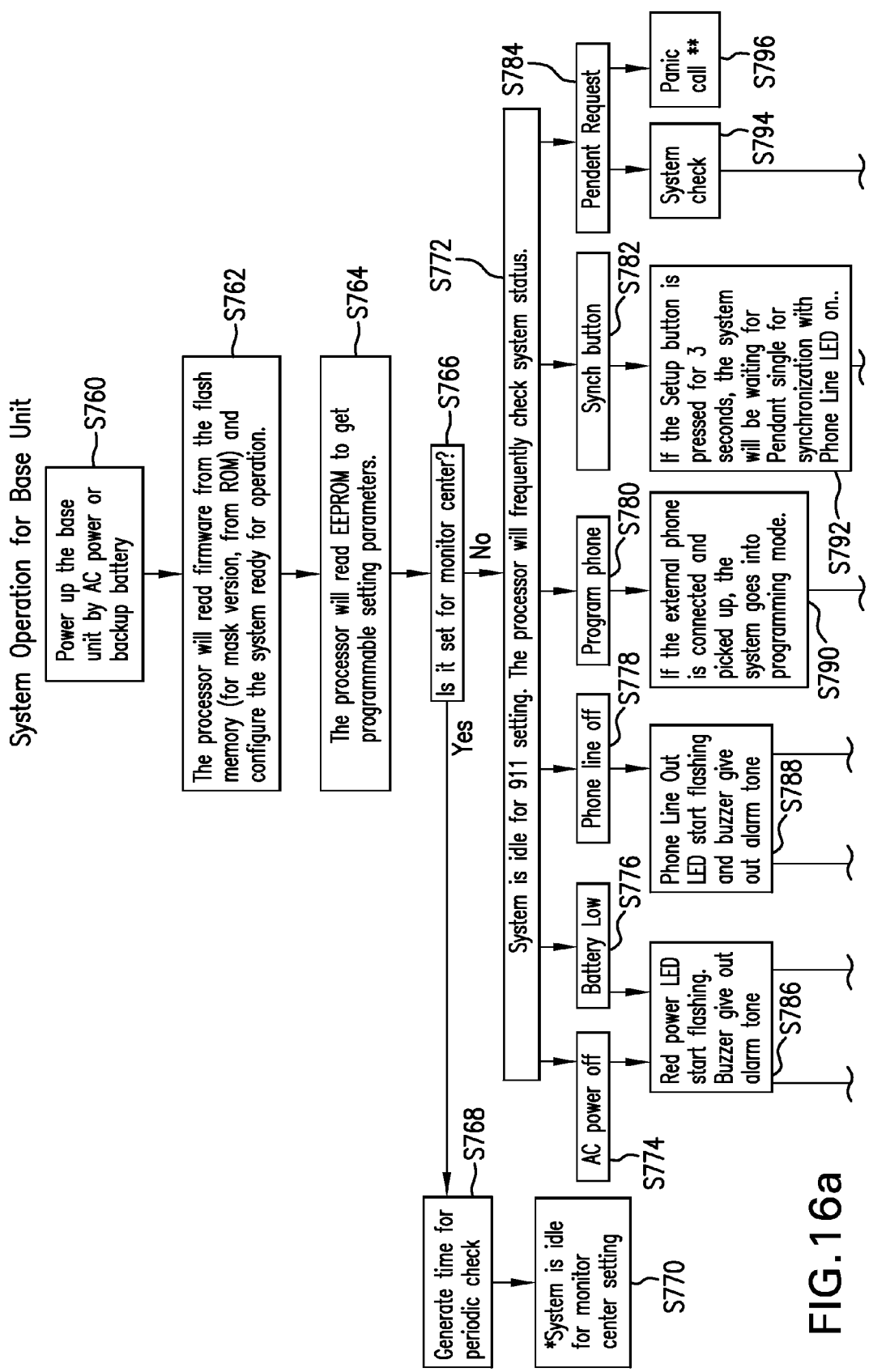
FIGS. 16a and 16b is a preferred embodiment of a flow chart showing system operation of the preferred base unit.
Figure 16B:
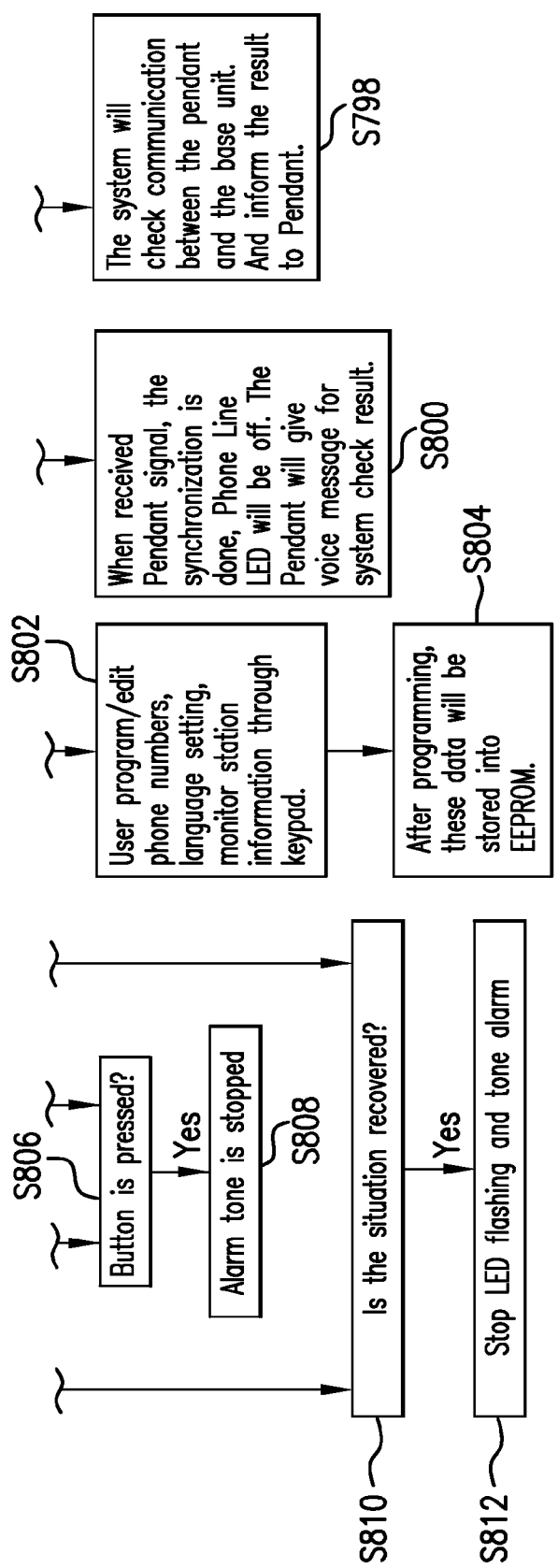

FIGS. 16a and b to 19a and b illustrate flow charts of the apparatus (system) shown in FIGS. 14 and 15 (also shown in block diagrams in FIGS. 11 and 12). The flow charts describe the operation of the novel system of the present invention. Referring initially to FIGS. 16a and b, shown is the flow chart for system operation of the base unit. The base unit is powered up in block step S760. The processor in step S762 will read firmware from the flash memory and configure the system ready for operation. To this end the processor will read the EE Prom to get the programmable settings in step S764, and then the query will be put, "Is system set for central monitoring stations?" in step S766. If the answer is YES, then the program proceeds to step S768 and generates time for periodic check, and the to step S770 where System is idle for central monitoring station setting, which will be described with reference to FIG. 17.

If the answer to step S766 is NO, the program proceeds to System is idle3 for 911 setting in step S772 and the processor will frequently check system status. In step S774 the AC power is checked. If off, in step S786 the red power LED starts flashing and buzzer gives out tone. Also, in step S806 the query is made, Button pressed?. If YES the program proceeds to step S808 and alarm tone is stopped. In step S810, the query is made, Is the situation recovered?. If YES, the program proceeds to step S812 and the LED is stopped flashing and the tone alarm is turned off. In step S776 the battery is checked and if low, the program proceeds to step S786. IN step S778 the phone line is checked and if off, in step S788 the phone line out LED starts flashing and the buzzer gives alarm. The program then proceeds to steps S806 and S810 as described.

In step S780 the phone is programmed. If an external phone is connected and picked up the system goes into programming mode. In step S802 the user program/edits phone numbers, language settings, central monitoring station information through the keypad. In step S804 the programmed data is stored in EE Prom. In step S782 the Synch Button is selected and in step S792 the Setup button is pressed for 3 seconds, the system will be waiting for Pendant signal for synchronization with Phone Line LED on. In step S800, when Pendant signal is received the synchronization is done. The Pendant will give voice message for system check result. In step S784 the Pendant Request is handled. In step 796, a Panic call is processed as will be described with respect to the flow chart shown in FIGS. 19a and b. In step S794, the program initiates a system check. In step S798 the system will check communication between the pendant and the base unit, and inform the result to the pendant.

Figure 17:
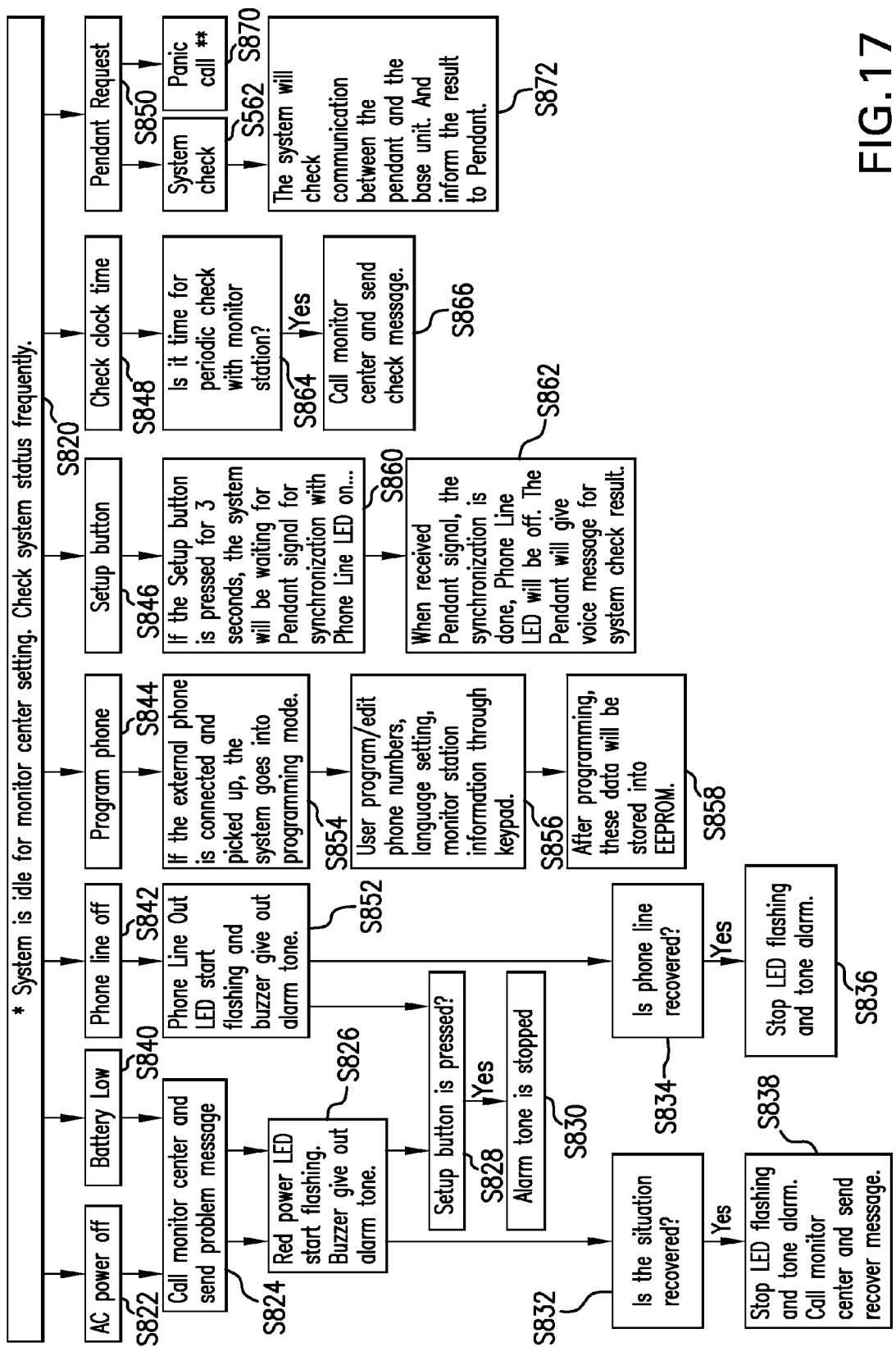
FIG. 17 is a preferred embodiment of a flow chart showing system idle for central monitor center setting.

If the system is set for central monitoring station, as determined in step S766, then System will idle for central monitoring station as shown in FIG. 17. When idle for the central monitoring station, the system checks status frequently in step S820. The system checks for AC power off in step S822, battery low in step S840, phone line off in step S842, program phone in step S844, Setup button in step S846, check clock time in step S848 and Pendant request in step S850. If AC power is off, the system calls the central monitoring station and sends problem message in step S824. This causes red power LED to start flashing and buzzer to give alarm in step S826. Then the program proceeds to step S832 and step S828. In step S832 the query is put, "Is the situation recovered?". If YES, the program proceeds to step S838 and the LED is stopped from flashing and the buzzer turned off. The central monitoring station is called and a recovery message is sent. In step S828 the query is put, "Setup button pressed?". If YES, the alarm tone is stopped in step S830. If the battery is low in step S840, the program proceeds to step S824 and onward as described. If the phone line is off in step S842 the Phone Line Out LED starts flashing in step S852 and the program proceeds to step S828 and so forth, and to step S834 where the query is put, "Is phone line recovered?". If YES, in step S836 the LED is stopped flashing and the tone alarm is turned off.

In step S844 the programming of the phone is selected by the activity in step S854, that is, if an external phone is conned to the base unit and picked up, the system goes into the programming mode. In step S856 the user will program/edit phone numbers, language setting, and central monitoring station information through the keypad. In step S858, after programming, the data will be stored in EEPROM. The setup button in step S846 is selected in the manner described in step S860, that is, if the setup button is pressed for 3 seconds, the system will be waiting for Pendant signal for synchronization with phone line LED on. When pendant signal is received in step S862, the synchronization is done. Phone line LED will be off. The pendant will give voice message for system check result.

Clock time is checked starting in step S848. In step S864 the query is put, "Is it time for periodic check with central monitoring station?". If YES, then in step S866 the central monitoring station is called and check message is sent. In step S850 the system awaits a pendant request. If for a system check in step S868, then in step S872 the system will check communication between the pendant and the base unit, and inform the result to pendant. If a Panic call is received in step S870, then the program will process as will be described with reference to FIGS. 19a and b.

Figure 18A:
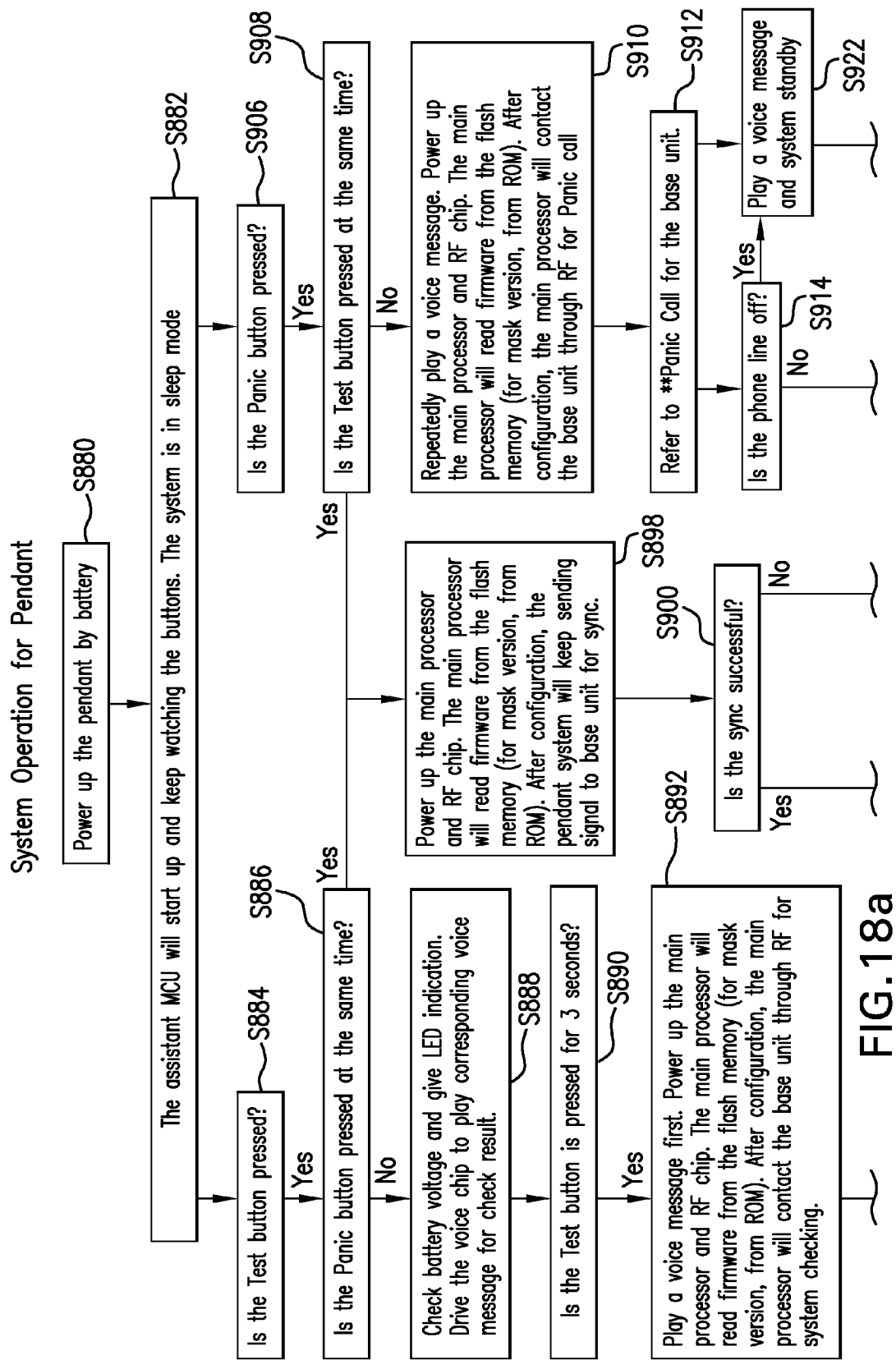
FIGS. 18a and 18b is a preferred embodiment of a flow chart showing system operation of the preferred pendant.
Figure 18B:
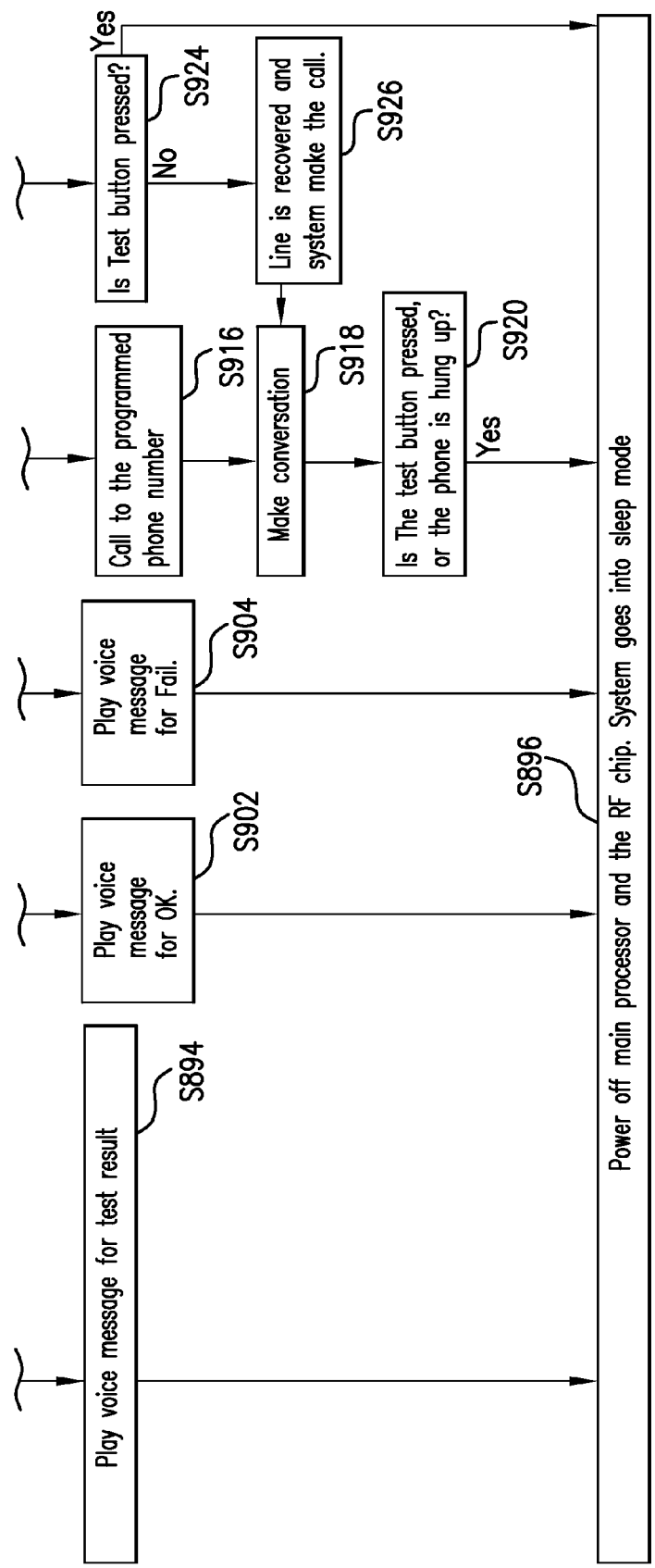

The flow chart of system operation for the pendant is illustrated in FIGS. 18a and b. In step S880 the pendant is powered up by battery. The assistant MCU (multipoint control unit) will start up and keep watching the buttons of the pendant. The system will be in the sleep mode in step S882. In step S884 the query is put, "Is the test button pressed?". If YES, the program proceeds to step S886 where the query is put, "Is the Panic button pressed at the same time?". If NO, the program proceeds to step S888 where the battery voltage is checked and an LED indication given. The voice chip is driven to play a corresponding voice message for check result. The program next proceeds to step S890 where the query is put, "Is the Test button pressed for 3 seconds?". If YES, in step S892 the system plays a voice message first, powers up the main processor and RF chip. The main processor will read firmware from the flash memory (for mask version, from ROM). After configuration, the main processor will contact the base unit through RF for system checking. Then in step S894, a voice message is played for the test result. The system then proceeds to step S896 where the power is off the main processor and the RF chip and the system goes into sleep mode.

Figure 19A:
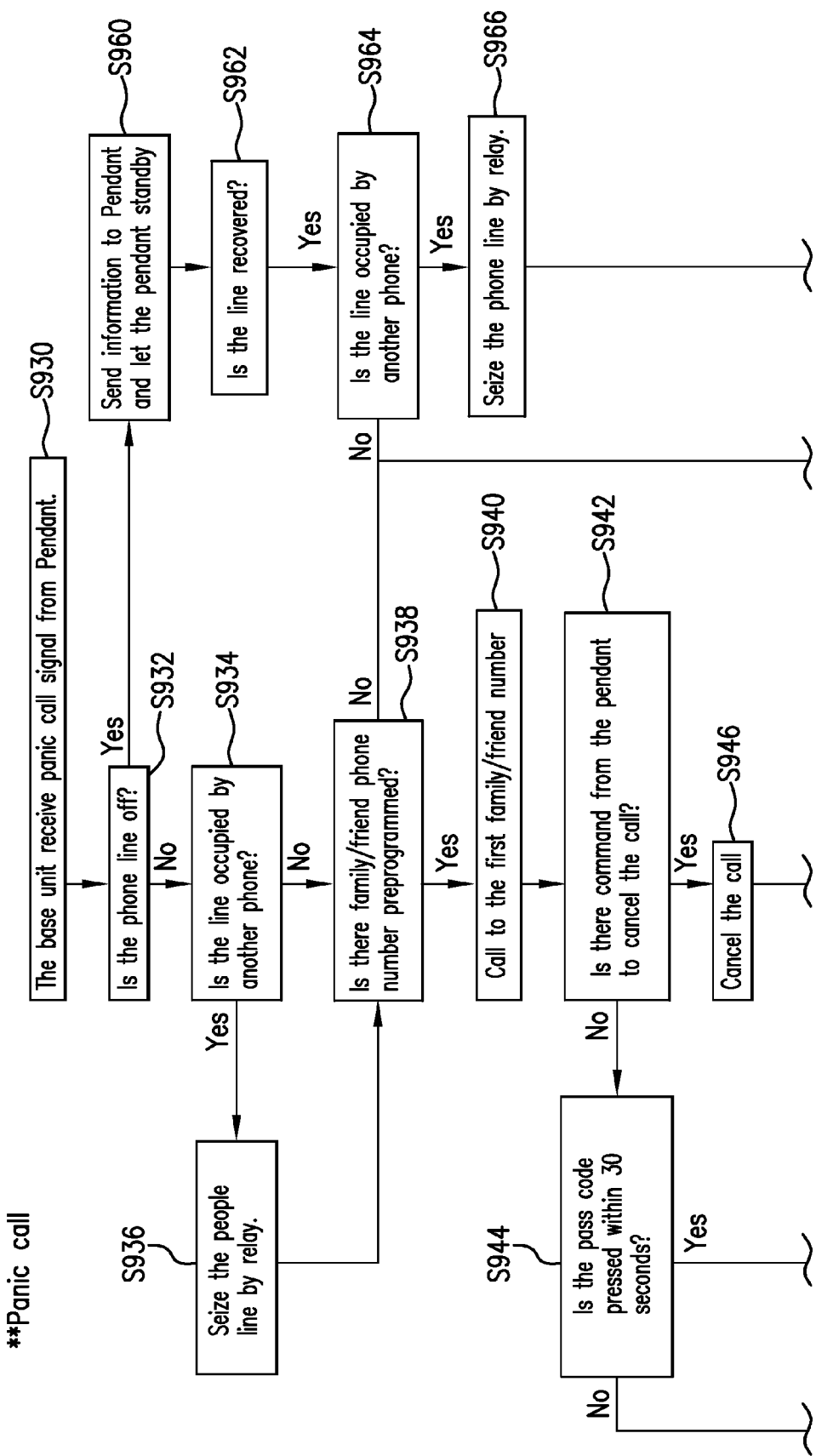
FIGS. 19a and 19b is a preferred embodiment of a flow chart showing system operation for a Panic Call.
Figure 19B:
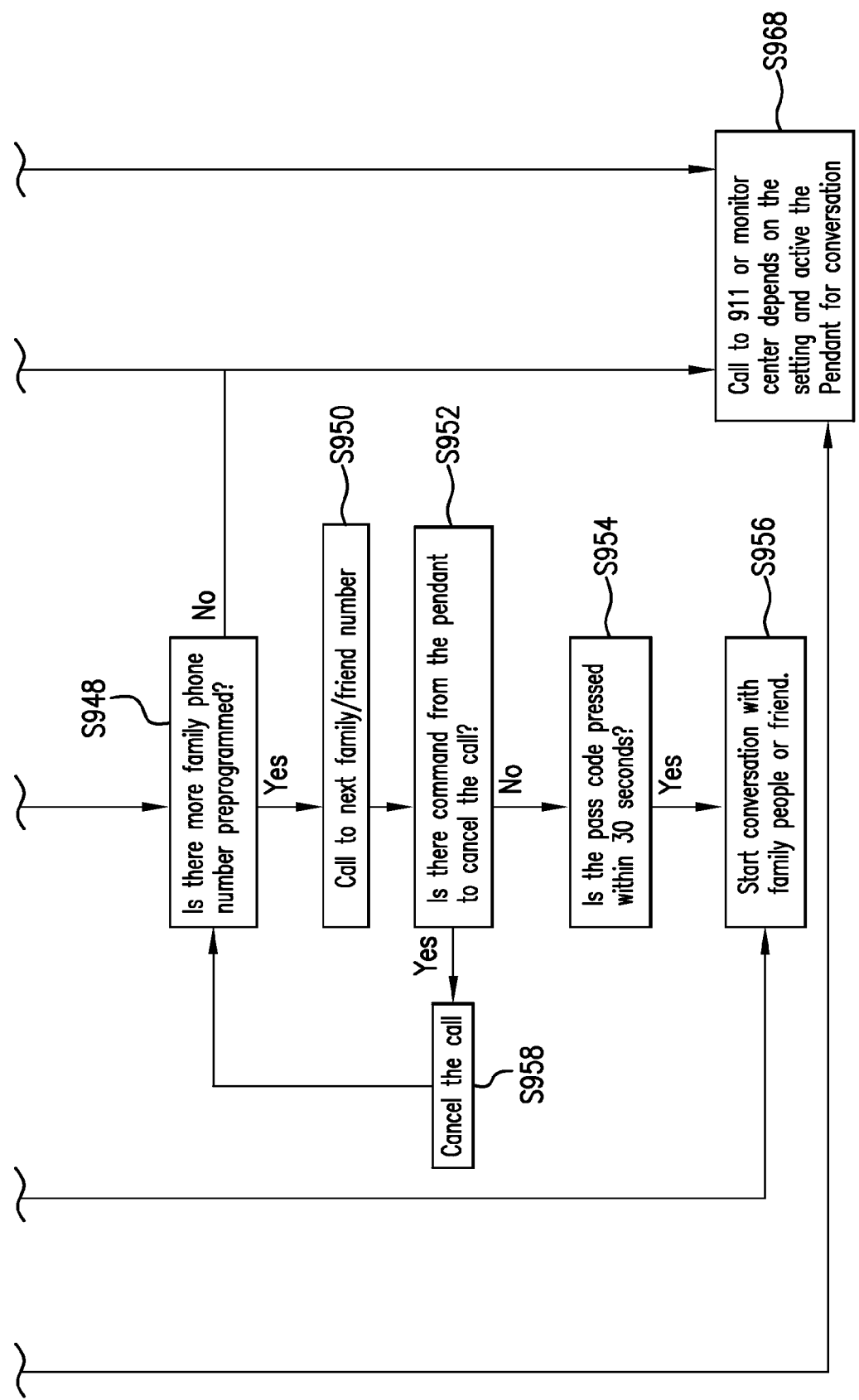

In step S906 the query is put, "Is the Panic button pressed?", If the answer is YES, the query is put in step S908, "Is the Test button pressed at the same time?". If the answer is NO, the program proceeds to step S910 and repeatedly plays a voice message, and powers up the main processor and RF chip. The main processor will read firmware from the flash memory (for mask version, from ROM). After configuration, the main processor will contact the base unit through RF for Panic call. The program steps to step S912 where the Panic call is processed in the base unit as illustrated in FIGS. 19a and b, and then to step S914 where the query is put, "Is the phone line off?". If NO, the program advances to step S916 and the programmed phone number is called. Conversation is made in step S918. The system then checks in step S920 if the test button has been pressed or the phone hung up. If YES, then the program proceeds to step S896 and goes into sleep mode.

If the response to step S886 or S908 is YES, the program proceeds to step S898 and the main processor and RF chip are powered up. The main processor will read firmware from the flash memory (for mask version, from ROM). After configuration, the pendant will keep sending signal to the base unit for synchronization. In step S900 the synchronization is queried. If YES, a voice message for OK is played in step S902.

If NO, a voice message for fail is played in step S904. The program proceeds from steps S902 and S904 to step S896 and goes into the sleep mode.

FIGS. 19a and b shows the flow chart for a Panic call signal received in the base unit from the pendant initiated in step S930. In step S932 the query is put, "Is the phone line off?". If NO, the program proceeds to step S934 where the query is put, "Is the line occupied by another phone?". If YES, the program proceeds to step S936 and the phone line is seized by relay, and then advances to step S938. If NO, the program advances to step S938. At step S938 the query is put, "Is there a family/friend phone number preprogrammed?". If the answer is YES, the program proceeds to step S940 where the first family/friend number is called. In step S942, the query is put, "Is there a command from pendant to cancel call?". If YES, the call is canceled in step S946 and if there is another family/friend phone number preprogrammed in step S950, a call is placed to the next family/friend number. If there is no cancel command from the pendant in step S952, and the pass code is pressed within 30 seconds in step S954, conversation commences in step S956. If a cancellation command is sensed in step S952, the call is cancelled in step S958 and the program loops back to step S948. If the response to step S942 is NO, and a pass code is sensed within 30 seconds in step S944, the program goes to step S956 and conversation commences. If no pass code is sensed within 30 seconds in step S944, the program goes directly to step S968 and a call is made to either 911 or the central monitoring station depending on the setting and programming and the pendant is activated for conversation. If the answer to step S932 is YES, the information is sent to the pendant in step S960 and the pendant is let to standby. In step S962 the query is put, "Is the line recovered?". If YES, the query is put, "Is the line occupied by another phone?" in step S964. If YES, the line is seized by relay in step S966, and the signal is sent to step S968 for calling 911 or the central monitoring station. If the response to step S938 or step S964 is NO, the signal is sent directly to step S968 for calling 911 or the central monitoring station.

In the system and method as described above there are ten voice clips, voice tags or messages that are played by the system, most through the speaker in the Pendant except (9), which is played to a friend or family member, as follows:
(1) Battery is ok
(2) Replace battery soon
(3) Replace battery now
(4) Help is on the way your pendant is turning off
(5) No phone line present, please standby
(6) System check all function are ok
(7) System check please stand by
(8) System test failed
(9) This is a medical alarm emergency phone call, please enter your pass code
(10) Your emergency phone call is now being dialed please standby The base unit can be configured to send a signal to a computer located in the vicinity of where the base unit is located. The computer can be connected or coupled to the base unit by hardwire or wirelessly in a known manner. The computer will be constantly running and connected to the Internet via a provider or gateway, and responsive to receiving the base unit signal, will retrieve from memory and send by email to preselected addressee(s) a prerecorded text message advising "(person's name) has activated his/her medical alert system". The computer will be programmed to transmit this message via email responsive to receiving the signal from the base unit. The signal from the base unit can be transmitted to the computer in parallel to whatever programmed actions are taking place in the base unit or transmitted serially when the base unit has finished its program with respect to 911, CMS or friend or family member. A suitable software package will be provided to user to program his computer; this can be done by CD or by downloading from a site on the Internet.

The base unit can contain extra locations, such as locations 11 to 14 that will be used responsive to user pressing the Panic button 16, if the system has notified 911 or CMS, as programmed, and not a friend or family member. Locations 11 to 14 will be telephone numbers of special people to be so notified. When activated in this respect, the system will send a prerecorded voice tag saying "a friend or family member has activated his/her medical alert system". This voice tag will be played over and over for at least one minute to insure that the call is answered and the message is either heard by a person or recorded as voice mail or a message of the person's telephone. This prerecorded voice tag will be sent automatically following completion of the 911 or CMS call to each person (telephone #) programmed into each location 11 to 14. The system can be provided with the option for factory recording of this voice tag, or the user can have the option of prerecording the message directly into a voice chip dedicated for this function, and the option of personalizing the message.

Another variation is for the base unit to include unlocked cell phone technology with capability but no service agreement or subscription with any provider. When the Panic button 16 is pressed, the base unit will call 911 and connect the user for conversation.

In this variation, the base unit is connected to AC power or a rechargeable battery. Since the base unit only contains the unlocked cell phone technology built in, but no subscription agreement with any provider, only 911 calls can be made. Thus, whenever the Panic button 16 is pressed, the base unit will directly call 911 and place the user in voice communication with the 911 operator. This simple system enables the user to transport the base unit with him/her whenever the user moves away from his/her home location. In essence the base unit becomes portable and can travel with the user. For example, when user moves by car to a friend's house for a visit or goes to a shopping location. The base unit can be unplugged and placed in the car either in battery mode or plugged into the cigarette lighter with an appropriate charging cord as used in current cell phone technology and operate off the car battery. When the user arrives at the friend's house or a shopping location, the base unit can be plugged into an outlet in the friend's house, or left in the car and operated on battery. In either case, the base unit is close to the user in the event of an emergency and when triggered by the signal from the Panic button 16 on the Pendant, the base unit will make a 911 call and place the user in direct conversational mode with a 911 operator.

Another variation of what is described in the preceding paragraph is that if the base unit is a hardwired connection, the system will alert the user by the LED flashing and the audio alarm (piezo) sounding, if at any time the hardwire telephone connection is lost. Under these circumstances, the system is pre-programmed automatically to use (switch to) the unlocked cell phone technology and call 911 in the manner as set forth in the preceding paragraph.

It is to be understood that the specific systems, methods and techniques which have been described above are merely illustrative of one application of the principles of the invention. Numerous modifications may be made to the system as described without departing from the true spirit and scope of the invention.

What is claimed is:

1. A versatile personal emergency response communications system, comprising:
(a) a portable communications unit intended to be carried by a user who may require emergency attention, including (1) a wireless transmitter—receiver for respectively transmitting and receiving communication signals; (2) a first microprocessor unit; (3) an emergency call button manually actuatable by a user to initiate a call request signal; (4) a test button manually actuatable by the user to initiate a system condition request; (5) a microphone through which the user can communicate by voice during a two-way voice communication between the user and an emergency responder; (6) a speaker to hear voice communications during a two-way voice communication between the user and the emergency responder and to hear voice messages; (7) an indicator for showing visually a status of the system; and (8) a battery;
(b) a base communications unit for coupling with a public dial-up telephone system for establishing two-way voice communication via the public dial-up telephone system between the user through the portable communications unit and an emergency responder, the base unit including (1) a wireless transmitter-receiver for respectively transmitting and receiving communication signals from and to the portable communications unit ; (2) a dialer for dialing a telephone number to establish two-way voice communication between the user and an emergency responder connected to the dial-up telephone system; (3) a second microprocessor unit; (4) a first connection for connecting a telephone to the base communications unit; (5) a second connection for connecting a computer to the base communications unit; (6) a power connection; (7) circuitry for conducting tests for determining system condition and generating a signal for transmission to the portable communications unit; and;
(c) a non-transitory computer readable storage medium storing computer readable and executable instructions, and a plurality of voice messages concerning (i) dialing an emergency responder responsive to the actuation of the emergency call button to place the user on the portable communications unit in two-way voice communication with the emergency responder (ii) results of system testing;
(d) wherein execution of the computer readable and executable instructions cause the versatile personal emergency response communications system (1) to be enabled to program the versatile personal emergency response communications system to selectively dial a central monitoring station instead of 911; (2) to be enabled to put the versatile personal emergency response communications system into a learning mode to be programmed responsive to (i) a predetermined key sequence of a telephone connected to the first connection of the base communications unit, (ii) a preloaded program in a computer connected to the second connection of the base communications unit, and (iii) by voice input to the microphone of the portable communications unit responsive to a predetermined actuation of the emergency call button and the test button of the portable communications unit; (3) to enable the versatile personal emergency response communications system to program the versatile personal emergency response communications system to selectively dial at least one of a list of prioritized telephone numbers and names of a plurality of third parties stored in the system; (4) to perform versatile personal emergency response communications system viability tests including at least one of battery condition, range test, phone line check, and voice recognition test; (5) to generate and transmit a voice message to the portable communications unit indicative of a viability test result that is played through the speaker of the portable communications unit (6) to establish two-way voice communication between the user speaking through the microphone and hearing through the speaker of the portable communications unit and the selected one of 911, a central monitoring station and one of said third parties responsive to the actuation of the emergency call button; (7) at the user's selection to dial successively the list of prioritized telephone numbers and names of the plurality of third parties until one answers and a correct preset code is received, to establish two-way voice communication between user speaking through the microphone and hearing through the speaker of the portable communications unit and the answering one of said third parties, and if none answer, then to dial automatically the selected one of 911 and a central monitoring station (8) to monitor the user speech through the microphone of the portable communication unit to determine if within a predetermined set time following actuation of the emergency call button, the user's voice instructs dialing one of the list of prioritized telephone numbers and names of the plurality of third parties, and if the third party answers, but no acknowledgement by appropriate preset code is received within a predetermined time, the versatile personal emergency response communications system will automatically dial the selected one of 911 and a central monitoring station, and if there is no answer by the third party within a predetermined time, the versatile personal emergency response communications system will automatically dial the selected one of 911 and a central monitoring station; (9) to play stored voice messages to the user through the speaker in the portable communications unit; and (10) to detect status of a call to the selected one of the emergency responders.

2. The versatile personal emergency response communications system according to claim 1 wherein the voice messages include a first voice message indicating that the telephone number of the emergency responder is being dialed, and a second voice message indicating that the call to the emergency responder is being terminated.

3. The versatile personal emergency response communications system according to claim 1 wherein the computer readable and executable instructions include terminating an initiated call responsive to actuation of at least one of the emergency call button and the test button on the portable communications unit in a predetermined manner.

4. The versatile personal emergency response communications system according to claim 1 wherein the computer readable and executable instructions cause the versatile personal emergency response communications system to sense if a phone line of a coupled public dial-up telephone system is out and responsive thereto transmit an indication thereof to the portable communications unit, and thereafter continuously monitor to determine phone line restoration and responsive thereto transmit an indication thereof to the portable communications unit.

5. The versatile personal emergency response communications system according to claim 1 wherein the computer readable and executable instructions cause the versatile personal emergency response communications system, responsive to a predetermined actuation of the test button, to transmit a test request signal to the base unit to perform a specified test correlated with the predetermined actuation of the test button and to initiate a voice message via the speaker in the portable communications unit announcing the results of the specified test.

6. The versatile personal emergency response communications system according to claim 1 wherein the indicator of the portable communications unit is a lamp for visually indicating the operational status of the portable unit.

7. The system versatile personal emergency response communications according to claim 1 wherein the computer readable and executable instructions for the versatile personal emergency response communications system include a requirement to enter a secret code in order to be able to program a central monitoring station.

8. The versatile personal emergency response communications system according to claim 1 wherein the computer readable and executable instructions for the versatile personal emergency response communications system includes periodic checks with a central monitoring station when a central monitoring station has been selected.

9. The versatile personal emergency response communications system according to claim 1 wherein the portable communications unit includes a housing having an opening within which the emergency call button is mounted, and a raised ring circumscribing the emergency call button and extending outwardly from the surface of the housing to provide the user with a tactile guide for locating the emergency call button.

10. The versatile personal emergency response communications system according to claim 9 wherein the speaker of the portable communication unit is waterproof and is located behind a grill with slanted slats for water drain, the microphone is mounted in a waterproof manner in the housing, and a drain hole in the housing is provided for drainage of water.

11. The versatile personal emergency response communications system according to claim 10 wherein the portable communications unit further includes a shock detector for sensing the portable communications unit being subjected to a shock of a predetermined value, and when so sensed, responsive thereto the computer readable and executable instructions initiate the system to transmit a signal to the base communications unit to directly dial the selected one of 911 and the central monitoring station.

12. The versatile personal emergency response communications system according to claim 1 wherein the stored voice messages convey the following individual meanings:
 (1) Battery is ok
 (2) Replace battery soon
 (3) Replace battery now
 (4) Help is on the way your pendant is turning off
 (5) No phone line present, please standby
 (6) System check all functions are ok
 (7) System check please standby
 (8) System test failed
 (9) This is a medical alarm emergency phone call; please enter your pass code
 (10) Your emergency phone call is now being dialed please standby.

13. The system versatile personal emergency response communications according to claim 1 further including a computer being coupled to the base communications unit, said computer containing an email program supported by a provider, said email program being programmed with at least one addressee for sending an email message that the user has activated his/her medical alert system, and being further programmed so that responsive to a signal from the base communications unit, the said email message is transmitted to said addressee.

14. The versatile personal emergency response communications system according to claim 1 further including a telephone number of at least one person known to the user stored in the versatile personal emergency response communications system and wherein the computer readable and executable instructions responsive to conclusion of notifying the selected one of 911 and the central monitoring station, as programmed, causes the stored telephone number of said at least one person to be dialed and when the telephone number answers a voice tag to be played continuously for a selected period of time advising that the user has activated his/her medical alert system.

15. The versatile personal emergency response communications system according to claim 1 wherein the versatile personal emergency response communications system further includes an unlocked cell phone capability to call 911 whereby responsive to loss of phone service on a coupled public dial-up telephone system to automatically switch to the unlocked cell phone and call 911.

16. The versatile personal emergency response communications system according to claim 1 wherein the versatile personal emergency response communications system further includes a back-up battery that is connected to be active responsive to power loss.

17. A method of calling an emergency response provider by a user requiring emergency attention by signaling via a user-carried, portable communications unit of a personal emergency response communications system that can place the user in direct voice communication with the emergency response provider, the personal emergency response communications system including the user-carried portable communications unit, a base communications unit and a non-transitory computer readable storage medium, said user-carried portable communications unit including (1) a wireless transmitter-receiver for respectively transmitting and receiving communication signals to and from a base communications unit; (2) a first microprocessor unit; (3) an emergency call button manually actuatable by a user to initiate a call request signal; (4) a test button manually actuatable by the user to initiate a system condition request; (5) a microphone through which user can communicate by voice during a two-way voice communication with an emergency response provider; (6) a speaker to hear voice communications during a two-way voice communication with the emergency response provider and to hear voice messages; (7) an indicator for showing visually status of the system; and (8) a battery;
 a base communications unit for coupling with a public dial-up telephone system for establishing two-way voice communication via the public dial-up telephone system between the user through the user-carried portable communications unit and an emergency response provider; the base unit including (1) a wireless transmitter-receiver for respectively transmitting and receiving communication signals from and to the user-carried portable communications unit; (2) a dialer for dialing a telephone number to establish two-way voice communication with an emergency response provider connected to the dial-up telephone system; (3) a second microprocessor unit; (4) a first connection for connecting a telephone to the base communication unit; (5) a second connection for connecting a computer to the base communication unit; (6) a power connection; (7) circuitry for conducting tests for determining system condition and generating a signal for transmission to the indicator of the user-carried portable communications unit;
 said non-transitory computer readable storage medium storing computer readable and executable instructions and a plurality of voice messages concerning (i) dialing an emergency response provider responsive to the actuation of the emergency call button, and (ii) results of system testing;
 said method including the steps of:
 (a1) connecting the personal emergency response communications system to a public dial-up telephone system;
 (a2) operating the personal emergency response communications system responsive to preprogramming for dialing a selected one of 911 and a central monitoring station as the selected emergency response provider;
 (b) putting the personal emergency response communications system into a mode to be programmed responsive to (i) a predetermined key sequence of a telephone connected to the first connection of the base communications unit, (ii) a preloaded program in a computer connected to the second connection of the base communications unit, and (iii) by voice input to the speaker of the user-carried portable communications unit responsive to a predetermined actuation of the emergency call button and the test button of the user-carried portable communications unit;
 (c) programming the personal emergency response communications system to selectively dial at least one of a list of stored prioritized telephone numbers and names of a plurality of third parties;
 (d) setting the personal emergency response communications system to perform a functional test of the operation of the personal emergency response communications system including at least one of battery condition, range test, phone line check, and voice recognition test;
 (e) generating and transmitting a voice message to the user-carried portable communications unit of the result of a functional test and playing via the speaker in the user-carried portable communications unit;
 (f) establishing two-way voice communication between the user-carried portable communications unit and the selected one of 911, a central monitoring station and one of said third parties responsive to the actuation of the emergency call button;
 (g) monitoring the user's speech responsive to the actuation of the emergency call button to determine if within a predetermined set time following actuation the user instructs dialing of one of the list of prioritized telephone numbers and names of the plurality of third parties, and if so, whether the third party answered, and acknowledged by appropriate preset code within a predetermined time, and if not, automatically dialing the selected one of 911 and a selected central monitoring station; and
 (h) playing stored voice messages to the user through the speaker in the user-carried portable communications unit.

18. The method of claim 17 further including coupling an unlocked cell phone capability, without any service, to the base communication unit; programming the system to store 911 and a central monitoring station as telephone numbers of emergency response providers, responsive to loss of communication from the base communication unit to the connected public dial-up telephone system, dialing a selected one of 911 and the central monitoring station via the coupled unlocked cell phone, and establishing two-way voice communication between the user-carried portable communications unit and the called emergency response provider.

19. The method of claim 17 further including the further steps of performing a functional test of the operation of the personal emergency response communications system in response to actuation of the test button on said user-carried portable communications unit; and if the functional test is successful, reporting to the user via a voice message played through the speaker of the user-carried portable communications unit that the functional test performed was successful.

20. The method of claim 17 including the further steps of transmitting to the user via the speaker in the user-carried portable communication unit a voice message responsive to the base communication unit placing a call to an emergency response provider that a call is being placed, and responsive to termination of a call to an emergency response provider a voice message that the call to the emergency response provider is terminated.

21. The method of claim 17 wherein the plurality of messages stored in said non-transitory computer readable storage medium convey the following individual meanings:

(1) Battery is ok
(2) Replace battery soon
(3) Replace battery now
(4) Help is on the way your pendant is turning off
(5) No phone line present, please standby
(6) System check all functions are ok
(7) System check please standby
(8) System test failed
(9) This is a medical alarm emergency phone call; please enter your pass code
(10) Your emergency phone call is now being dialed please standby; and
the method includes the further step of playing voice messages to the user via the speaker in the user-carried portable communication unit as appropriate.

* * * * *